United States Patent
Godwin et al.

(10) Patent No.: US 6,341,954 B1
(45) Date of Patent: Jan. 29, 2002

(54) MOLDING SYSTEM USING FILM HEATERS AND/OR SENSORS

(75) Inventors: Harold Godwin, Brampton; George Olaru, North York; David Whiffen, Bolton, all of (CA)

(73) Assignee: Husky Injection Molding Systems Ltd. (CA)

( * ) Notice: Subject to any disclaimer, the term of this patent is extended or adjusted under 35 U.S.C. 154(b) by 0 days.

(21) Appl. No.: 09/550,639

(22) Filed: Apr. 14, 2000

Related U.S. Application Data

(63) Continuation of application No. 09/096,388, filed on Jun. 12, 1998.

(51) Int. Cl.$^7$ .............................................. B29C 45/20
(52) U.S. Cl. ........................................ 425/549; 425/570
(58) Field of Search ............................. 425/547, 549, 425/570, 572, 573, 143, 145

(56) References Cited

U.S. PATENT DOCUMENTS

| | | |
|---|---|---|
| 2,979,773 A | 4/1961 | Bolstad |
| 3,970,821 A | 7/1976 | Crandell ..................... 219/523 |
| 4,120,086 A | 10/1978 | Crandell ..................... 29/611 |
| 4,132,971 A | 1/1979 | Caddock, Jr. ................ 338/61 |
| 4,203,197 A | 5/1980 | Crandell ..................... 29/611 |
| 4,273,525 A | 6/1981 | Reitan ........................ 425/549 |
| 4,304,544 A | 12/1981 | Crandell ..................... 425/549 |
| 4,310,401 A | 1/1982 | Stahl ........................ 204/195 S |
| 4,390,485 A | 6/1983 | Yang .......................... 264/25 |
| 4,396,899 A | 8/1983 | Ohno .......................... 338/34 |
| 4,455,744 A | 6/1984 | Zandman ................... 29/610 R |
| 4,485,387 A | 11/1984 | Drumheller ............. 346/140 R |
| 4,510,036 A | 4/1985 | Takeuchi et al. ............ 204/425 |
| 4,514,160 A | 4/1985 | Davidsmeyer .............. 425/143 |
| 4,557,685 A | 12/1985 | Gellert ....................... 425/549 |
| 4,570,150 A | 2/1986 | Zandman et al. ........... 338/329 |
| 4,583,284 A | 4/1986 | Gellert ........................ 29/611 |
| 4,641,423 A | 2/1987 | Crandell ..................... 29/611 |
| 4,659,906 A | 4/1987 | Furtek ........................ 219/345 |
| 4,739,657 A | 4/1988 | Higashi et al. ............... 73/204 |
| 4,748,982 A | 6/1988 | Horzewski et al. ......... 128/344 |
| 4,768,283 A | 9/1988 | Gellert ........................ 29/611 |
| 4,782,708 A | 11/1988 | Harrington et al. ...... 73/861.05 |
| 4,795,126 A | 1/1989 | Crandell ..................... 249/78 |
| 4,859,981 A | 8/1989 | Peschl ........................ 338/308 |
| 4,863,665 A * | 9/1989 | Schad et al. |
| 4,882,203 A | 11/1989 | Witmer ....................... 427/124 |
| 4,897,028 A | 1/1990 | Barancik et al. ............ 425/144 |
| 4,899,435 A | 2/1990 | Trakas ......................... 29/611 |
| 4,911,636 A | 3/1990 | Gellert ........................ 425/549 |
| 4,922,082 A | 5/1990 | Bredt et al. ................. 219/541 |
| 4,964,795 A | 10/1990 | Tooman ...................... 425/144 |
| 5,007,818 A * | 4/1991 | Barancik et al. |
| 5,046,942 A | 9/1991 | Gellert ........................ 425/549 |
| 5,051,086 A | 9/1991 | Gellert ........................ 425/549 |
| 5,085,572 A | 2/1992 | Leverenz .................... 425/549 |
| 5,112,025 A | 5/1992 | Nakayama et al. ......... 249/115 |
| 5,155,340 A | 10/1992 | Morita et al. ............... 219/543 |
| 5,215,597 A | 6/1993 | Kreider ...................... 136/225 |

(List continued on next page.)

FOREIGN PATENT DOCUMENTS

| | | | |
|---|---|---|---|
| EP | 0312029 B1 | 5/1994 | ........... H05B/3/48 |
| JP | 55067417 A | 5/1980 | ........... B26D/23/03 |
| JP | 5-116182 | 5/1993 | ........... B29C/45/26 |

*Primary Examiner*—Tim Heitbrink
(74) *Attorney, Agent, or Firm*—Katten Muchin Zavis

(57) ABSTRACT

Improved mold manifold and hot runner nozzle using thin film elements include at least one active or passive thin film element disposed along a melt channel between the manifold inlet and the hot runner nozzle. Preferably, the thin film element may comprise a thin film heater in direct contact with the molten resin and position to aid in the heat and flow management of the resin within the melt channel. Thin film temperature sensors, pressure sensors, and leak detectors may also be provided in the vicinity of the melt channel to enhance process control in the injection molding machine.

16 Claims, 22 Drawing Sheets

U.S. PATENT DOCUMENTS

| | | |
|---|---|---|
| 5,226,596 A | 7/1993 | Okamura ........................ 239/1 |
| 5,234,637 A | 8/1993 | Reymann et al. .......... 264/40.6 |
| 5,320,513 A | 6/1994 | Schmidt ..................... 425/143 |
| 5,411,392 A | 5/1995 | Von Buren ................. 425/549 |
| 5,421,715 A | 6/1995 | Hofstetter et al. .......... 425/547 |
| 5,456,592 A | 10/1995 | Shindo ....................... 425/549 |
| 5,468,141 A | 11/1995 | Iwami et al. ............... 425/542 |
| 5,470,219 A | 11/1995 | Yokoyama et al. ......... 425/144 |
| 5,504,304 A | 4/1996 | Noguchi et al. ............ 219/426 |
| 5,518,389 A | 5/1996 | Nonomura et al. ......... 425/144 |
| 5,521,357 A | 5/1996 | Lock et al. ................. 219/543 |
| 5,521,576 A | 5/1996 | Collins ....................... 338/307 |
| 5,527,177 A | 6/1996 | Potter ......................... 425/190 |
| 5,536,164 A | 7/1996 | Brun, Jr. et al. ............ 425/547 |
| 5,548,268 A | 8/1996 | Collins ....................... 338/307 |
| 5,561,296 A | 10/1996 | Goto ........................... 250/352 |
| 5,569,398 A | 10/1996 | Sun et al. .............. 219/121.68 |
| 5,569,474 A | 10/1996 | Kitaichi et al. ............. 425/547 |
| 5,573,692 A | 11/1996 | Das et al. ................... 219/543 |
| 5,614,233 A * | 3/1997 | Gellert |
| 5,632,078 A | 5/1997 | Potter ........................... 29/611 |
| 5,641,421 A | 6/1997 | Manov et al. .............. 219/553 |
| 5,645,867 A * | 7/1997 | Crank et al. |
| 5,653,932 A | 8/1997 | Aida et al. .................. 264/219 |
| 5,683,731 A * | 11/1997 | Deardurff et al. |
| 5,705,793 A | 1/1998 | Kitaichi et al. ............. 219/544 |
| 5,871,786 A * | 2/1999 | Hume et al. ................ 425/573 |
| 5,895,591 A | 4/1999 | Kojima et al. .............. 219/209 |
| 5,916,467 A | 6/1999 | Shimada ..................... 219/543 |
| 5,973,296 A | 10/1999 | Juliano et al. .............. 219/424 |

\* cited by examiner

MOLDING SYSTEM USING FILM HEATERS AND/OR SENSORS

This application is a continuation of application Ser. No. 09/096,388, filed Jun. 12, 1998.

BACKGROUND OF THE INVENTION

1. Field of the Invention

The present invention relates to an improvement in heat management and process control for a molding process and, more particularly, to the use of active and/or passive film heating and/or sensing elements located along a flow channel of molten resin to a mold cavity space.

2. Description of the Related Art

In an injection molding process, it is important to maintain a resin in a molten state as it flows from a nozzle of an injection molding machine, through a mold sprue bushing, a mold manifold, a hot runner nozzle, and into a mold cavity space, where the resin cools to form an injection-molded article. Additionally, the shear stress profile of the flow of resin must be monitored and managed to insure proper filling of the cavity space. This is especially important in the area close to the mold gate because the temperature there is rapidly cycled between hot and cold conditions before the molded article is removed from the cavity. Temperature control issues are also very important when molding certain thermally sensitive materials such as PET in a multicavity mold or when molding articles made of different materials that are injected through a single hot runner nozzle. Accordingly, much effort has been directed towards improving heat management and process control in the injection molding process, particularly in the mold manifold and hot runner nozzle. To date, several methods and means have been employed with varying degrees of success. Included among the methods and means commonly employed are heat pipes, high frequency induction heaters, microwave heaters, ceramic heaters, infrared radiation heaters, electrical heaters, etc. Such electric heaters include coils, band, or cartridge heaters which are used to heat the molten resin inside the screw barrel, in the machine nozzle, in the manifold, in the hot runner nozzle, and in the mold gate area.

U.S. Pat. No. 5,645,867 issued to Crank, et al. (incorporated herein by reference) illustrates the current state of the art with respect to heating the mold manifold. (Bank, et al. teaches heating the manifold by disposing infrared radiation heaters on an outer surface of the manifold. However, as is typical of such prior art manifold heating apparatus a significant proportion of the heat generated by the heaters is wasted heating the entire manifold block rater than directly heating the resin flowing in a melt channel contained therein.

U.S. Pat. No. 5,614,233 issued to Gellert (incorporated herein by reference) discloses a state of the art heater for a hot runner nozzle, in which a helical electrical heater is embedded in a spiral groove that surrounds the hot runner nozzle. The heater comprises a resistive wire enclosed in a refractory powder electrical insulating material such as magnesium powder oxide. The helical portion of the heater is press-fitted and reshaped into place in the spiral groove. However, the disclosed heater heats both the hot runner nozzle body and the melt channel contained therein, a relatively inefficient heating arrangement. Additionally, manufacturing the spiral groove and assembling the heater therein is time-consuming and costly.

The foregoing problems with prior art heaters are particularly evident in coinjection and multiinjection mold manifolds and hot runner nozzles. For example, U.S. Pat. No. 4,863,665 issued to Schad, et al, (incorporated herein by reference) discloses the use of a single electrical heater attached to the outer surface of a hot runner nozzle to heat three melt channels simultaneously. Schad, et al., however, faces several drawbacks. First, less heat is transmitted to the inner channels than to the outer channels. Second, the heat supplied to each channel cannot be varied according to the size of each channel and the Theological characteristics of the resin flowing therein.

European Patent 312 029 B1 issued to Hiroyoshi (incorporated herein by reference) discloses a heater made of an insulating ceramic film that is flame-sprayed on the outer surface of the nozzle which introduces the resin into the molding machine. The heater may be a continuous area heater completely covering the nozzle, a heater made of a plurality of longitudinal strips, a thin film heater made of helical strips, or a two piece independent heater with more power supplied to the nozzle where it contacts the mold. However, the heater disclosed in Hiroyoshi has several significant drawbacks that militate against its application to a mold manifold or hot runner nozzle. First, the Hiroyoshi heater is not removable and thus requires replacement of the entire element when the heater burns out. Second, the heater inefficiently heats the entire machine nozzle body rather than directly heating the molten resin. Third, the healer cannot provide a profiled temperature gradient across the flow of molten resin, an important feature for managing shear stress in the flow of molten resin. Finally, the thickness of the disclosed heater is 0.5 to 2 mm, which is acceptable for application to the outer surface of the machine nozzle, but intolerable for application to the interior of a melt channel in a mold manifold or hot runner nozzle.

U.S. Pat. Nos. 5,007,818 and 5,705,793 disclose the use of heaters which are deposited directly on the flat surface of the cavity mold. U.S. Pat. No. 5,504,304 discloses a removable ceramic heater made of a ceramic paste whose thickness is hard to control. Such heaters as these do not provide for intimate contact with the nozzle body or the nozzle tip and thus reduce heat transfer and increase heat loss. Reference also made be had to the following U.S. patents (each of which is incorporated herein by reference) which disclose heater technology, U.S. Pat. Nos. 5,155,340; 5,488,350; 4,724,304; 5,573,692; 5,569,398; 4,739,657; 4,882,203; 4,999,049, and 5,340,702.

Accordingly, there is a need in the art for a method and means of heating a melt channel of a mold manifold and hot runner nozzle in a manner that is efficient in terms of energy, space, and location.

There is an additional need in the art for an efficient method and means of providing an appropriate amount of heat to each melt channel in a coinjection or multiinjection hot runner nozzle based on the localized size and shape of each melt channel and the theological characteristics of the resin flowing therein.

SUMMARY OF THE INVENTION

It is an object of the present invention to provide method and apparatus for efficient heat and flow management of molten resin within the melt channel of a mold manifold and a hot runner nozzle.

According to one aspect of the present invention, apparatus used in conjunction with an injection molding machine includes a cavity plate, a core plate disposed relative to the cavity plate to define a cavity space, and a manifold having formed therein an inlet passage for receiving a flow of molten resin from a nozzle of the injection molding machine. A hot runner nozzle is also provided for directing the flow of molten resin from the manifold inlet passage to the cavity space. A mold gate is also provided for regulating the flow of molten resin from the hot runner nozzle to the cavity space, the mold gate together with the hot runner nozzle and the manifold inlet passage defining a non-flat melt channel for directing the flow of molten resin from the nozzle of the injection molding machine to the cavity space. An active or passive thin film element is disposed along the non-flat melt channel. Preferably, the thin film element is an active heater in contact with the molten resin.

According to another aspect of the present invention, apparatus used in conjunction with an injection molding machine includes a mold defining a cavity space, and a manifold having formed therein an inlet passage for flow communication with a nozzle of the injection molding machine. A hot runner nozzle is provided for flow communication with each of the cavity space and the manifold inlet passage, the hot runner nozzle and the manifold inlet passage together defining a melt channel. A plurality of active or passive thin film elements are intermittently disposed along the melt channel.

According to a further aspect of the present invention, apparatus for directing a flow of molten resin from a nozzle of an injection molding machine to a cavity space defined by a mold includes a manifold having formed therein an inlet passage for receiving the flow of molten resin from the nozzle of the injection molding machine. A hot runner nozzle is provided for directing the flow of molten resin from he manifold inlet passage to the cavity space, the hot runner injection channel and manifold inlet passage together defining a melt channel. An active or passive thin film element is disposed within the melt channel.

According to yet a further aspect of the present invention, apparatus for directing a flow of molten resin-supplied by an injection molding machine to a cavity space defined by a mold includes a hot runner nozzle having a plurality of melt channels for directing the flow of molten resin supplied by the injection molding machine to the cavity space. A plurality of active/passive thin film elements is disposed substantially adjacent to each melt channel for supplying heat to the flow of molten resin within that melt channel.

Yet a further aspect of the present invention includes apparatus to be used in conjunction with an injection molding machine. A cavity plate is provided, and a core plate is disposed relative to the cavity plate to define a cavity space. A hot runner nozzle is provided and includes a plurality of melt channels, each melt channel directing one of multiple flows of molten resin supplied by the injection molding machine to the cavity space. An active or passive thin film element is disposed along each melt channel.

According to a further aspect of the present invention, a method of injection molding includes the steps of injecting molten resin into a melt channel defined by a manifold and a hot runner nozzle, and disposing an active or passive thin film element along the melt channel for heating the molten resin.

These and other objects, features, and advantages can be better appreciated with reference to the following drawings, in which like reference numerals refer to like elements throughout

BRIEF DESCRIPTION OF THE DRAWINGS

The present invention is described in conjunction with the accompanying drawings, in which.

DETAILED DESCRIPTION OF THE PREFERRED EMBODIMENTS

1. Introduction

Figure 1C:
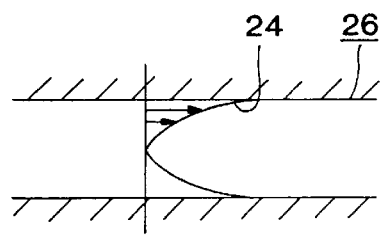
FIG. 1(c) is a longitudinal cross sectional view of the melt channel of FIG. 1(a) schematically depicting the shear stress profile of the resin as it flows through the melt channel.

The advantageous features of the present invention will be described with respect to a plastic injection molding machine utilizing thin film heater and sensor technology. Of course, the invention is not limited to such embodiments, but may be applied in any molding technology within the scope of the attached claims.

As described below, an injection molding system according to the present invention may include electrical heaters and temperature sensors to better manage and control the flow of the molten resin between in the injection machine nozzle and the mold cavity space. Thus, the present invention may comprise active and/or passive film elements which may be deposited directly on the surface of the mold elements (such as in the manifold and/or adjacent the mold gate area) to precisely manage the temperature profile in the moving, molten resin. For some applications, these film elements may be deposited directly on the nozzle housing and/or the nozzle tip, on a runnerless probe, on a valve stem, or on a surface of a mold gate insert. In other cases, the film elements may be deposited on a removable heater plug which is located at one or more predetermined positions in the molding system. Preferably, the active film element comprises a film heater, and the passive film element comprises a thermal sensor (e.g., a thermistor or thermal couple) and/or a pressure sensor. The film elements may be single layer elements, but preferably comprise a sandwich of several film layers having different electrical, thermal, and wear characteristics. One film layer will usually be made of an electrically highly-resistive material. Depending upon the particular molten-resin and the particular molding process characteristics, the film can be either a "thin" or "thick" element which is preferably deposited using chemical deposition, vapor deposition, film spray techniques, or equivalents thereof. The film heating and sensing elements may also comprise flexible substrates which are trimmed and installed, as needed, at any location in the injection molding machine.

Also within the scope of the present invention is the use of such film elements in conjunction with the known heaters described above. By carefully selecting the appropriate film heating elements (when used in conjunction with or in place of known heaters) fine adjustments may be made to the molten resin temperature gradient and profile to provide precise heat flow control. Such precise control can be effected before the molten resin enters the heated space, thus providing constant (or precisely-managed) viscosity and velocity of the melt flow.

If the film heater is directly deposited, this can also eliminate the air gap between the heater and the heated surface thus providing intimate and direct contact for unproved temperature transfer between the heater and the heated surface, to achieve energy savings and longer heater life. Also, the dirt deposition of the film heater makes the mold elements themselves simpler to design and manufacture since they may be made smaller and more energy efficient and use less space within the mold machine itself. Furthermore, the quality of the molded articles is significantly improved because of the precise management of the heat flow in the injection molding machine. Additionally, when molding an article that has several resin layers deposited at once, the use of film heater elements will allow each layer to having a uniform thickness and length. In the case of molding PET preforms using the film heaters described below, the acetaldehyde level is lower and is more uniformly distributed across the cavities of the multi-cavity mole. This is because the film heaters are located adjacent the melt channels and can be individually controlled and activated so that the temperature is very uniform across the entire manifold.

Also, by improving the heating control at the mold gate area, the sprue gate (vestige) of the molded preform may be made very small with substantially no crystallinity penetrating the preform wall.

Further, the use of the film heaters according to the present invention will provide significant advantages when molding two different color resins through the same nozzle. Precise heat control will allow an abrupt transition between the different colors, increasing the quality of the final product and reducing wastage.

Thus, the film heaters according to the present invention are in intimate contact with the surface to be heated, and can provide faster heating response time, lower temperature inertia, are small enough to be placed in many different areas of the mold, and can provide a tightly constrained temperature profile which leads to faster molding, higher quality in the produced articles, smaller machine parts, reduced energy consumption, and longer machine life.

By utilizing film sensors according to the present invention, more precise temperature management and control of the entire process can be achieved. Such film sensors can be placed in many more locations than known thermal couples, and are easily installed, maintained, and monitored. Therefore, process feedback and control is also enhanced according to the film sensors of the present invention.

2. Preferred Embodiments of the Present Invention

The present embodiments locate compact active and/or passive film elements along a melt channel from, for example, a sprue bushing to a mold cavity space to improve heat and flow management there. The active elements, which may be fabricated using advanced thin film technologies, are compact, reliable, stable, and energy efficient. Advantageously, the active elements may be located near or in direct contact with a flow of molten resin. The active elements may be any of a thin film heater, thermistor, thermocouple, resistance temperature detector, pressure sensor, gas sensor, optical guide leakage sensor, or combinations and equivalents thereof. The passive elements, which also may be fabricated using thin film technologies, interact with the active elements and may be made of electrical and thermal insulative materials and/or wear resistant materials. Preferably, the passive elements are in direct contact with the flow of molten resin to improve the laminar flow thereof. Employing these thin film elements optimizes heat management and overall control of the injection molding process. In particular, the thin film elements may directly heat the resin in the manifold or hot runner nozzle according to local and customized needs. Further, the use of thin film elements favorably impacts material selection and component size along the melt channel.

The present embodiments also provide an innovative mold controller and logic operation means either coupled to or embedded in the mold. The mold controller and logic operation means are physically independent from, but in communication with, the controller and microprocessor of the injection molding machine. In this regard, reference is made to U.S. Pat. No. 5,320,513 issued to Schmidt, assigned to the assignee of the present invention, and incorporated herein by reference. Schmidt discloses a mold integrated circuit board that connects the hot runner nozzle heaters and temperature sensors to the machine controller via a connector. According to the present embodiments, the printed circuit board of the mold disclosed by Schmidt further carries control and logic signals generated by a mold controller and/or a mold microprocessor. Thus, the end user of the mold will better be able to handle the processing parameters of the mold in conjunction with various injection molding machines. The mold-machine interface will allow either the mold, the machine, or both to be tuned for specific injection molding processing conditions. Also, the interface will reduce the complexity of the injection molding controls. Communication between the mold controller and the machine controller and/or between the active thin film elements and the mold controller may be accomplished by either wired or wireless means, with the latter further reducing the complexity of the wire connections.

Mold heat management and process control depend, on the specific application, the type of resin used, the mold manifold and hot runner nozzle design, and the number of mold cavities. The present embodiments could be applied to improve heat management and process control in several molding processes, three of which processes relate to high cavitation molding and, more particularly, to injection molding of blowable PET preforms.

Figure 1B:
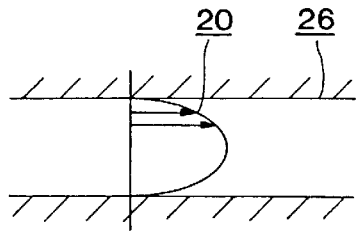
FIG. 1(b) is a longitudinal cross sectional view of the melt channel of FIG. 1(a) schematically depicting the velocity profile of the resin as it flows through the melt channel.
Figure 1A:
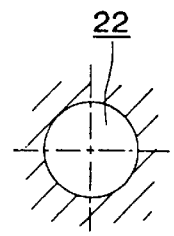
FIG. 1(a) is an axial cross sectional view of a circular melt channel of a mold manifold.
Figure 1D:
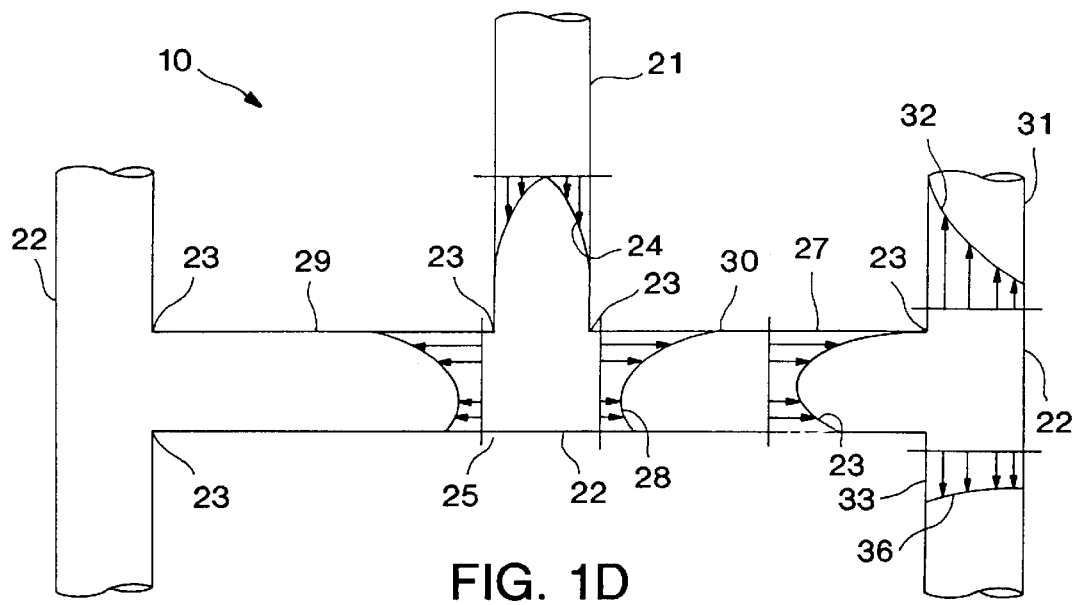
FIG. 1(d) is a cross sectional view of a manifold, including a network of melt channels, schematically depicting variations in the shear stress profile of the resin as it flows through the manifold.

A first application of the present invention reduces and more uniformly distributes acetaldehyde ("AA") inherently generated in a mold during the injection process. European Patent Application 293 756 A2 by Halar, et al., filed by the assignee of the present invention and incorporated herein by reference, thoroughly discusses the problems associated with AA formation. According to Halar, et al., a high level of AA is generated by non-uniform thermal degradation of PET as it flows through manifold channels. This phenomenon is demonstrated in FIGS. 1(a), 1(b), and 1(c), in which the velocity profile 20 and the shear stress profile 24 are schematically depicted for the flow of resin through a channel 22 of a mold manifold. Due to the melt charnel profile 26, the resin flows faster at the center of the channel where the shear stress is minimum, thus forming boundary layers that are symmetrical across the flow. The temperature profile is similar to the shear stress profile, i.e., the temperature of the resin is minimum at the center of the channel. In most molding applications, however, the resin flow does not follow a straight path, as shown in FIGS. 1(b) and 1(c), but rather makes one or more angular turns through a series of branch channels that simultaneously feed a plurality of cavity spaces (see FIG. 3). As indicated in FIG. 1(d), when the resin flow through one channel 21 is diverted 90° into several branches, such as the first two channels 27 and 29, the velocity, shear stress, and temperature profiles become asymmetrical as the resin flows slower around the inner corner 23 than the outer corner 25. At this stage, the shear stress and temperature values 30 are higher near the inner corner 23 than the values 28 near the outer corner 25. This asymmetrical behavior further is enhanced and reduced respectively when the flow again is diverted into channels 31 and 33. Not only are shear stress and temperature profiles 32 and 36 asymmetrical, but they are also different from one another.

Halar, et al. teaches that different asymmetrical profiles in different melt channels of a high cavitation mold cause AA differences in molded parisons. According to Halar, et al., the AA level can be minimized and made more uniform by providing static mixers within the melt channels of the mold manifold. Unfortunately, however, the static mixers induce a pressure drop and an increase in shear stress. U.S. Pat. No. 5,421,715 issued to Hofstetter, et al. discloses the use of static metallic elements called spokes in the manifold channels to create turbulence and homogenize the temperature distribution across the flow, thus reducing the AA level. The spokes of Hofstetter, et al. are no different than the static mixer of Halar, et al. and thus do not represent the ideal solution. In summary, providing mechanical obstructions within the melt channel may more uniformly redistribute the AA level among the injection cavities, but doing so creates additional problems.

Figure 2A:
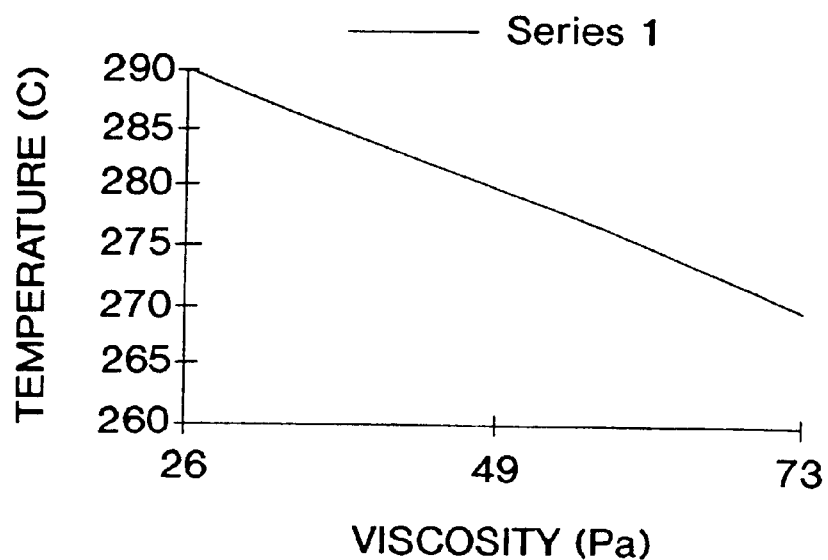
FIG. 2(a) is a graph showing the relation between temperature and viscosity at a constant shear rate.
Figure 2B:
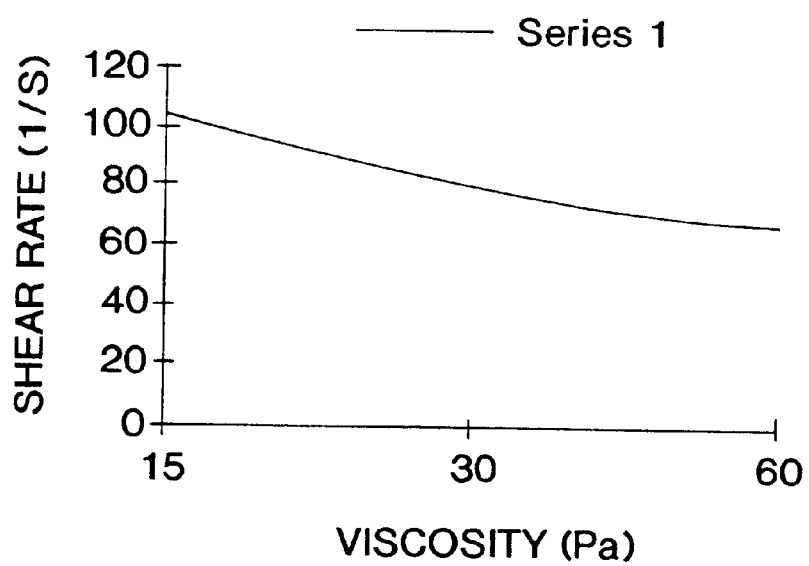
FIG. 2(b) is a graph showing the relation between shear rate and viscosity at a constant temperature.
Figure 2C:
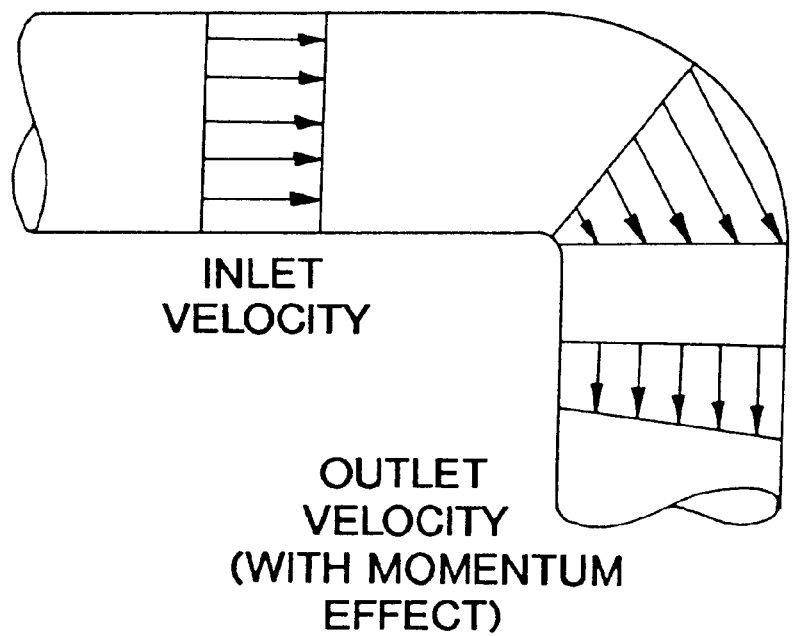
FIG. 2(c) is a longitudinal cross sectional view of a melt channel showing the velocity of a flow of resin as it rounds a corner in the melt channel.
Figure 2D:
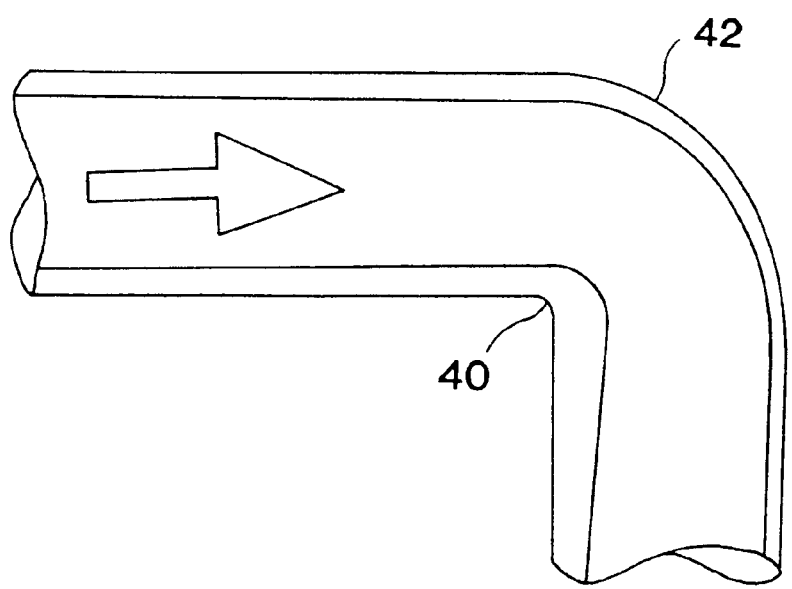
FIG. 2(d) is a longitudinal cross sectional view of a melt channel showing boundary layers formed therein by a flow of resin.
Figure 3:
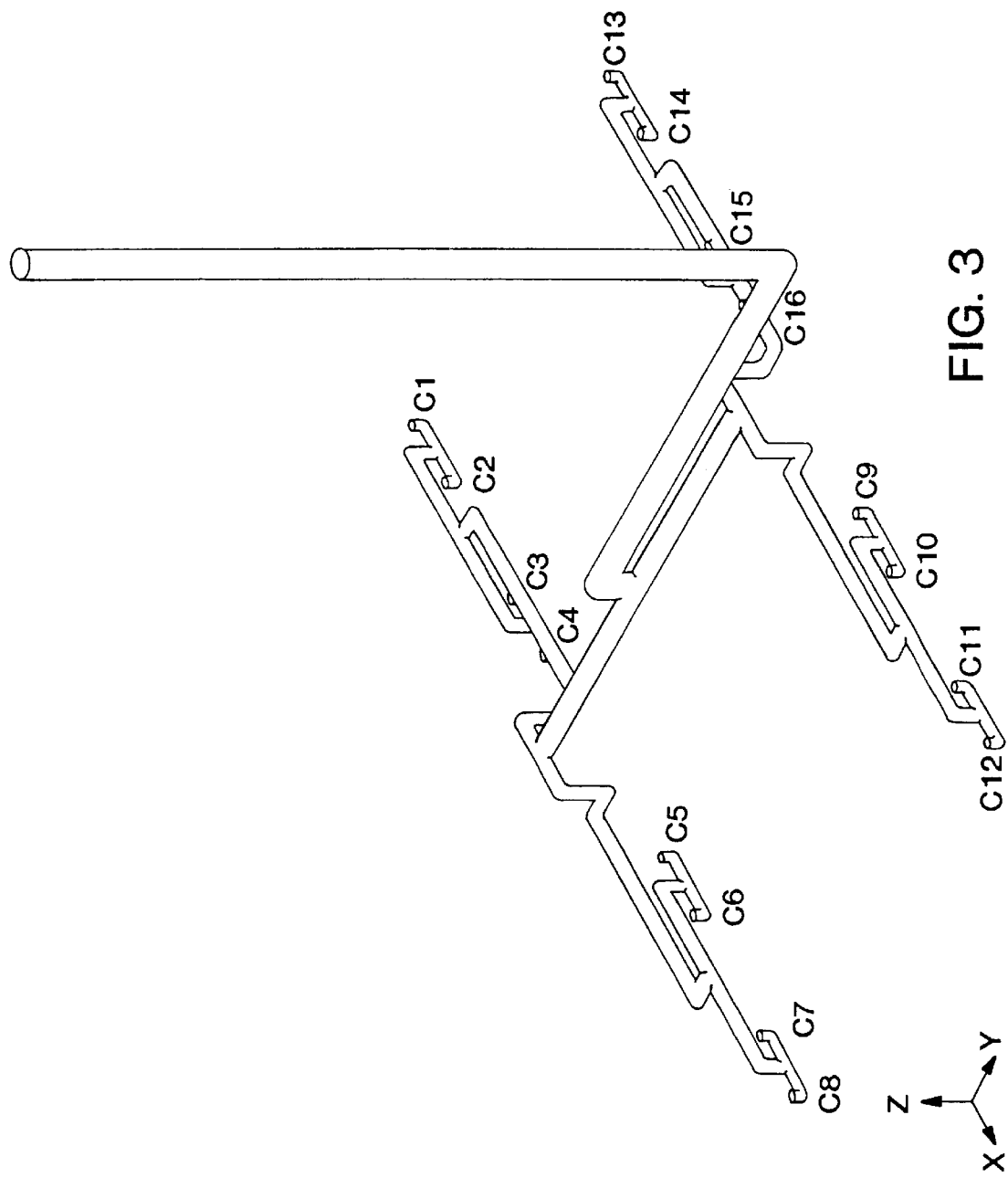
FIG. 3 is an elevated perspective view of a mold manifold showing a plurality of 90° turns.
Figure 4A:
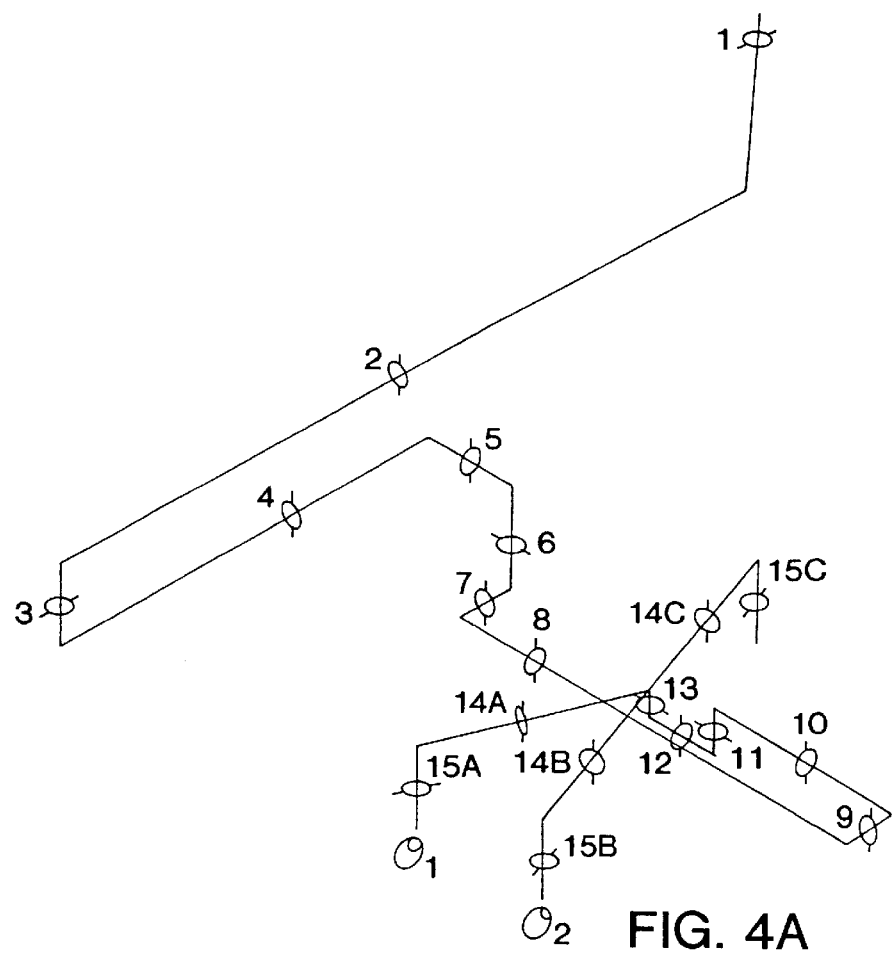
FIG. 4(a) is a schematic representation of a mold manifold.
Figure 4B:
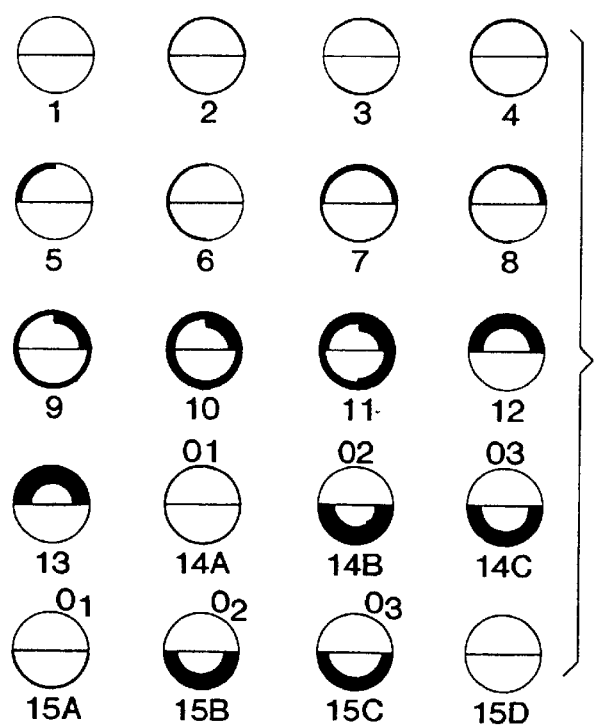
FIG. 4(b) is a series of axial cross sectional views of the mold manifold of FIG. 4(a) showing uneven formation and distribution of boundary layers.

A second application of the present invention promotes more uniform filling of high cavitation molds by suppressing the thermal and viscosity boundary layers that typically form when a flow abruptly changes direction. FIGS. 2(a) and 2(b) depict the temperature versus viscosity and shear rate versus viscosity graphs for a typical molten resin. As shown in FIGS. 2(c) and 2(d), an inner layer 40 is hotter and moves at a slower velocity than the middle and outer layers. If a manifold feeds several cavities, as shown in FIG. 3, the formation of boundary layers will cause asymmetrical temperature, shear stress, and velocity profiles for the flow of resin for each cavity, as shown in FIGS. 4(a) and 4(b). This problem, also mentioned by Halar, et al., may be solved by using a "melt flow redistributor" such as that disclosed in co-pending U.S. patent application Ser. No. 08/570,333 by Deardurff; et al., now U.S. Pat. No. 5,683,731 assigned to the assignee of the current invention and incorporated herein by reference. The "melt flow redistributor" is located after a 90° turn in a melt channel. Thus positioned, this device redirects the outer boundary layer of ren, which is more thermally degraded that the central layer, in a balanced proportion among several melt channels. Because this device works differently than a static mixer, it does not induce a pressure drop. However, the "melt flow redistributor" is relatively difficult to assemble and service.

Figure 5:
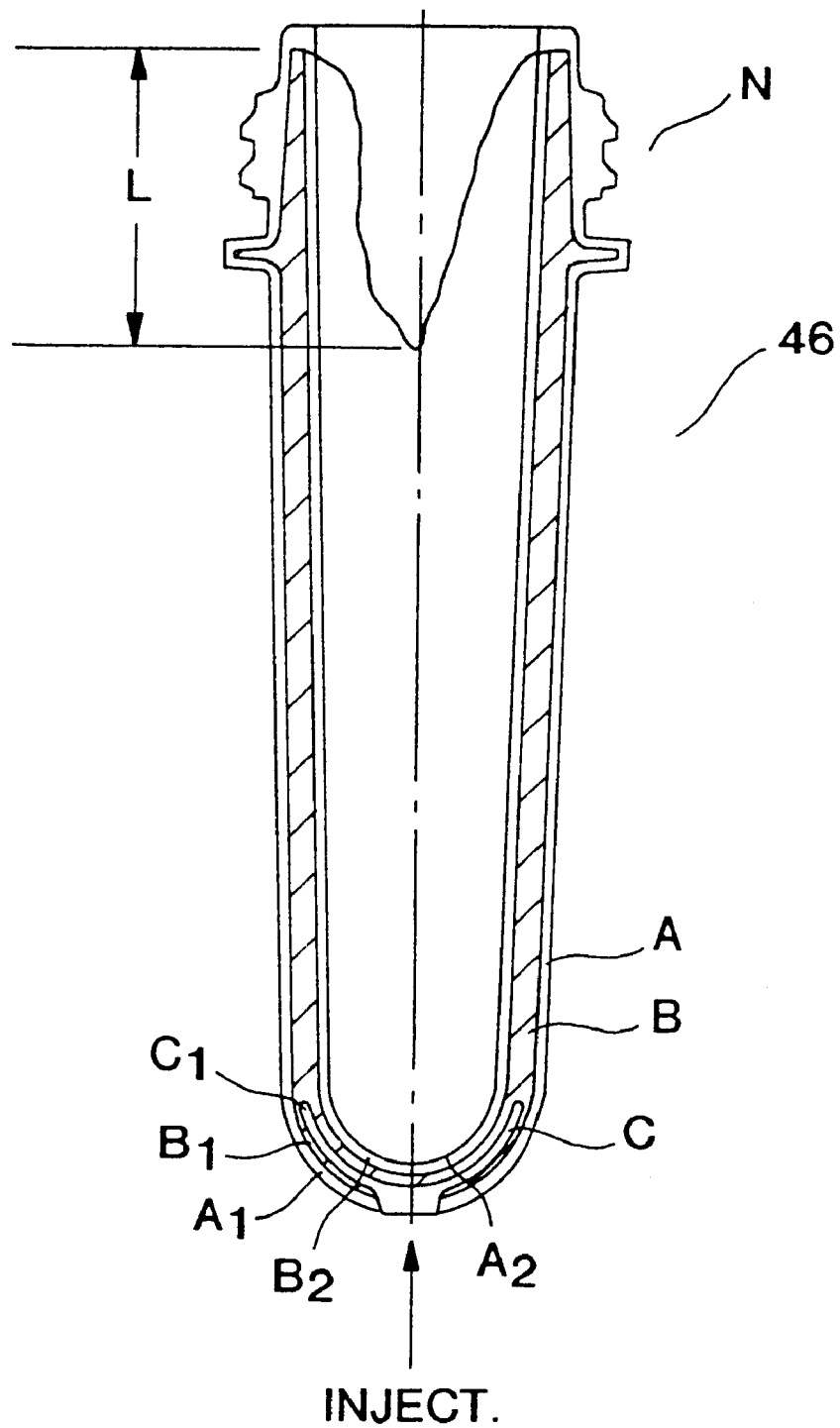
FIG. 5 is a longitudinal cross sectional view of a three-material, five-layer PET preform showing incomplete penetration of one of the layers, a phenomenon known as DIP.

A third application of the present invention, derived from the second application, combats a phenomenon known as dip. The dip is an uneven or unfilled portion within a coinjected layer. FIG. 5 illustrates the dip phenomenon occurring in a typical three-material (A-B-C) five-layer (A1-A2-B1-B2-C) PET preform 46. A dip of length L appears in the neck portion N of the preform 46. Three resins A-B-C are either sequentially or simultaneously coinjected using conventional injection means to form a five-layer blowable preform. The dip is unacceptable because one resin (usually the barrier) does not fully fill the space in the neck area partially occupied by the other resin (virgin, etc.). The dip is believed to be caused by the formation of boundary layers within a manifold. These boundary layers cause non-uniform temperature and viscosity profiles across a flow of molten resin, which in turn causes dip. The dip may be improved by providing static mixers within the melt channels, but as mentioned previously, such static mixers create additional problems.

The present invention overcomes the AA, non-uniform filling, and dip problems by replacing or supplementing conventional coil or band heaters with film heaters strategically disposed along the melt channels and individually controlled to provide the desired heat profile. For example, thin film heaters placed adjacent to each corner 23 can be controlled to provide more heat to the resin flow than thin film heaters placed adjacent zone 22 of the melt channels in order to provide a constant temperature profile throughout the melt channel. Thus located, the thin film heaters can change the velocity, temperature, and shear saws profiles of the flowing resin according to the specific geometry of each melt channel and angle of intersection with adjoining melt channels.

A fourth application of the present invention relates to various improvements of current injection molding components that, in most instances, do not provide an optimum temperature profile in a flow before the molten resin enters the mold cavity space. Examples of such components that would benefit from application of the present invention include coinjection hot runner nozzles, edge gating nozzles, tips of injection nozzles, nozzle-manifold interfaces, rim gating nozzles, mold gate inserts, etc.

Improved components embodying film heaters and insulation layers will now be discussed with reference to several U.S. patents, each of which is assigned to the assignee of the present invention and incorporated herein by reference.

Figure 6:
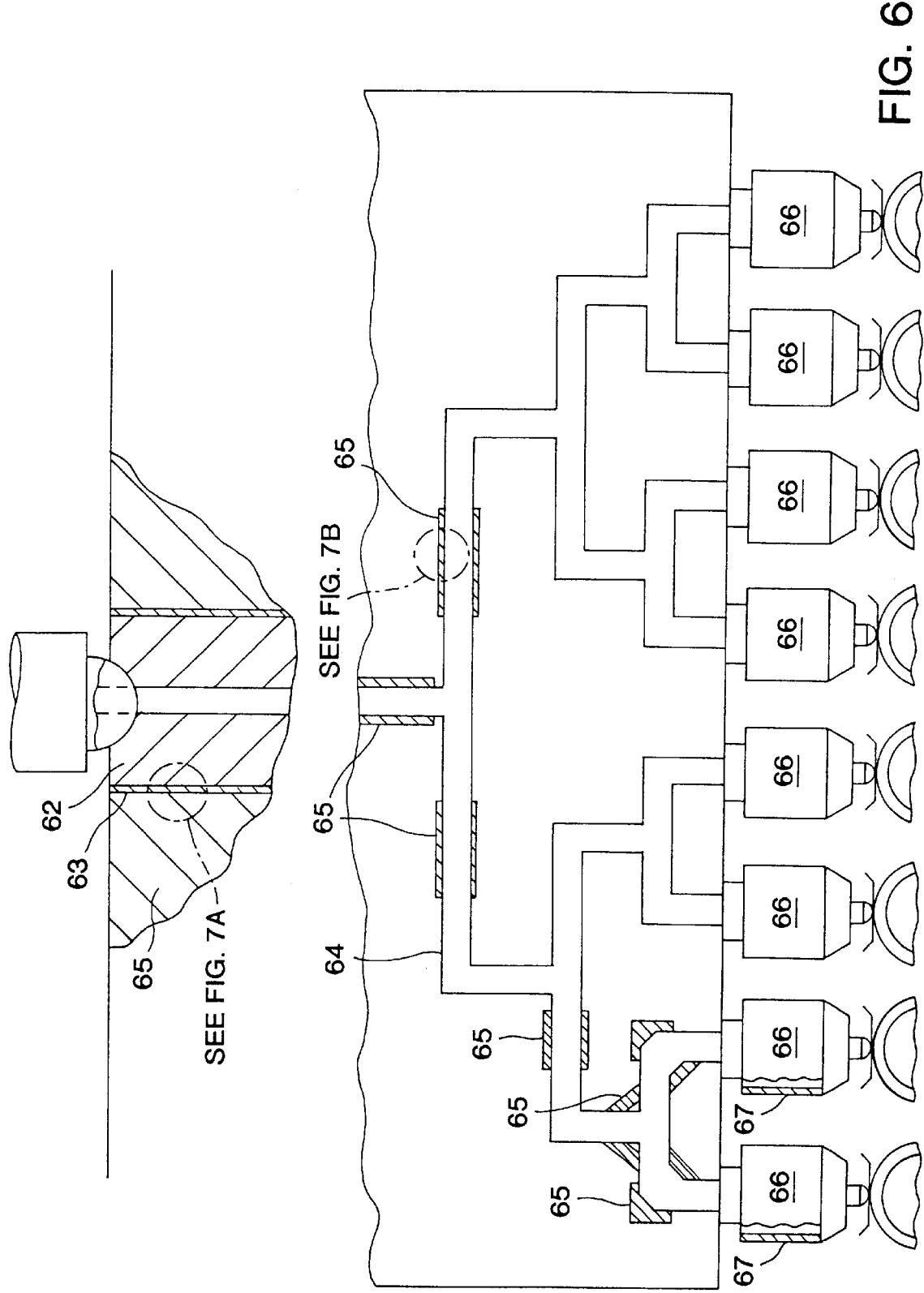
FIG. 6 is a schematic cross section of a high cavitation mold comprising thin film manifold and hot runner heaters in accordance with an embodiment of the present invention.
Figure 7A:
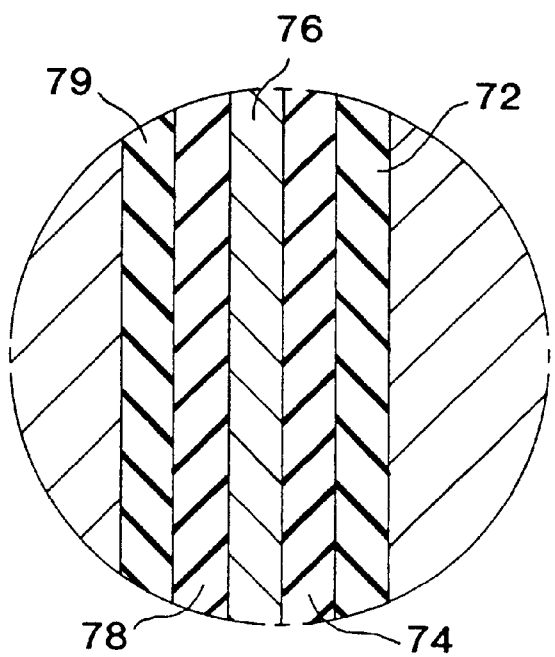
FIG. 7(a) is a schematic cross section showing the layers of tin film elements in the thin film heater 62 of FIG. 6.
Figure 7B:
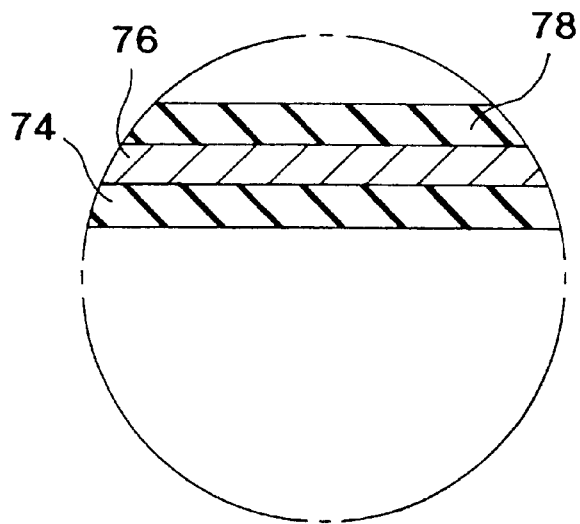
FIG. 7(b) is a schematic cross section showing the layers of thin film elements in the thin film heater 65 of FIG. 6.

FIG. 6 is a schematic cross section showing a high cavitation mold sprue bushing 62, manifold 64, and hot runner nozzles 66 which are heated using thin film heaters 63, 65, and 67, respectively. Each thin film heater comprises an active film made of a thin film, electrically conductive material sandwiched between assorted passive thin film materials. If the thin film heater is internally located so as to directly contact the molten resin, the thin film heater 62 may comprise (as shown in FIG. 7(a)), in order staring from the channel, a wear resistive film 72, an electrically insulative film 74, the electrically resistive heater film 76, another layer of electrically insulative film 78, and finally a thermally insulative film 79. If the thin film heater 65 is externally located (as shown in FIG. 7(b)), the wear resistive film may be omitted. Likewise, in some applications the thermally insulative film may be omitted.

Figure 8A:
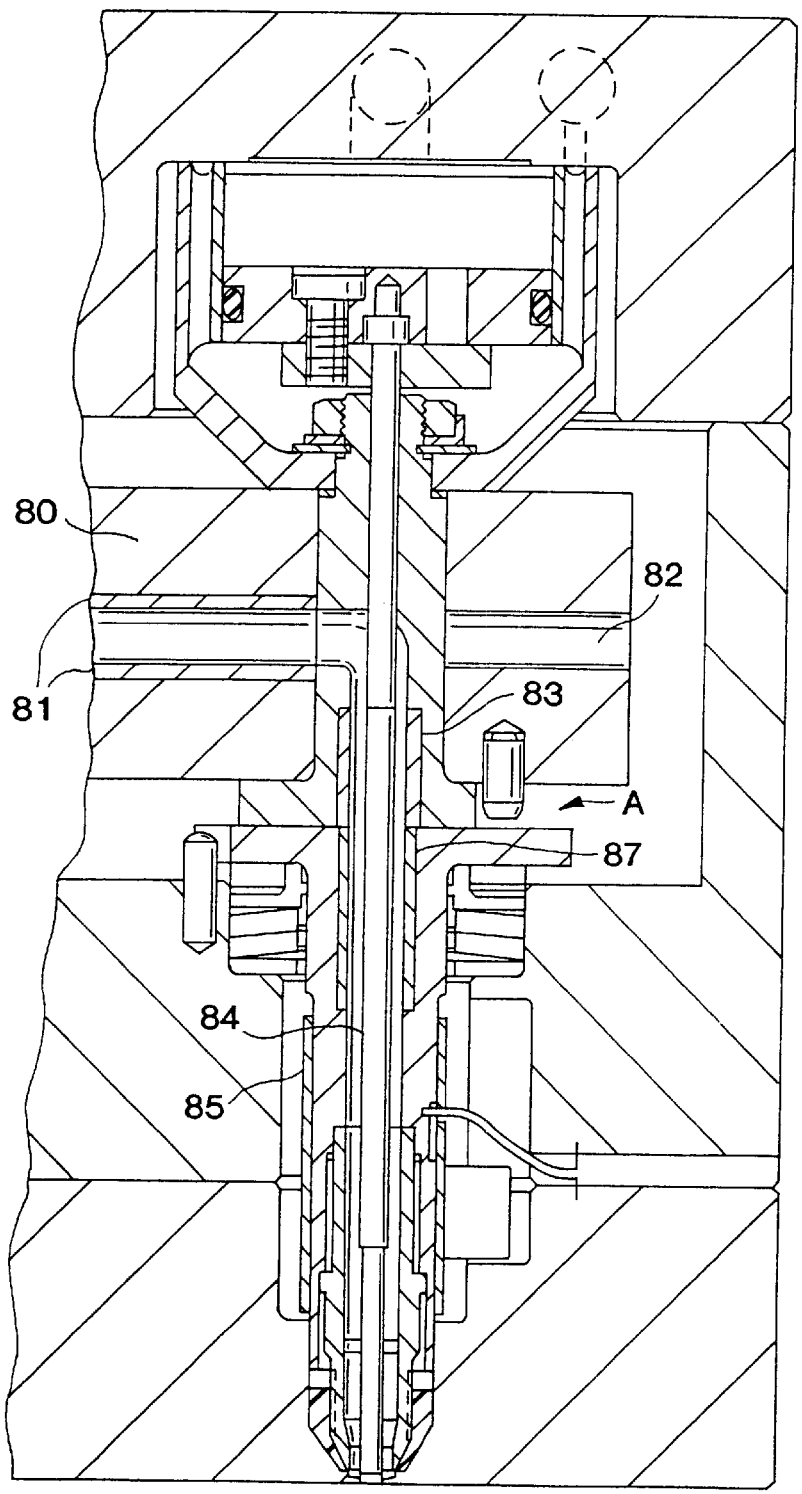
FIG. 8(a) is a cross sectional view of an improved hot runner nozzle design in accordance with another embodiment of the present invention.
Figure 8B:
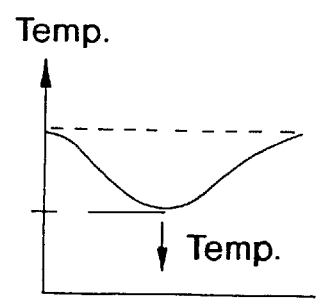
FIG. 8(b) is a chart showing the lack of temperature drop in the upper portion of the hot runner nozzle.

FIG. 8(a) shows an improved design of an injection mold in which the manifold 80, manifold bushing 82, and hot runner nozzle 84 are individually heated using thin film electrical heaters 81, 83, and 85, respectively. Because a thin film heater 87 may be located inside the nozzle body and in contact with the molten resin, no temperature drop occurs in the upper portion A of the hot runner nozzle, as shown by the broken line in FIG. 8(b).

Figure 9:
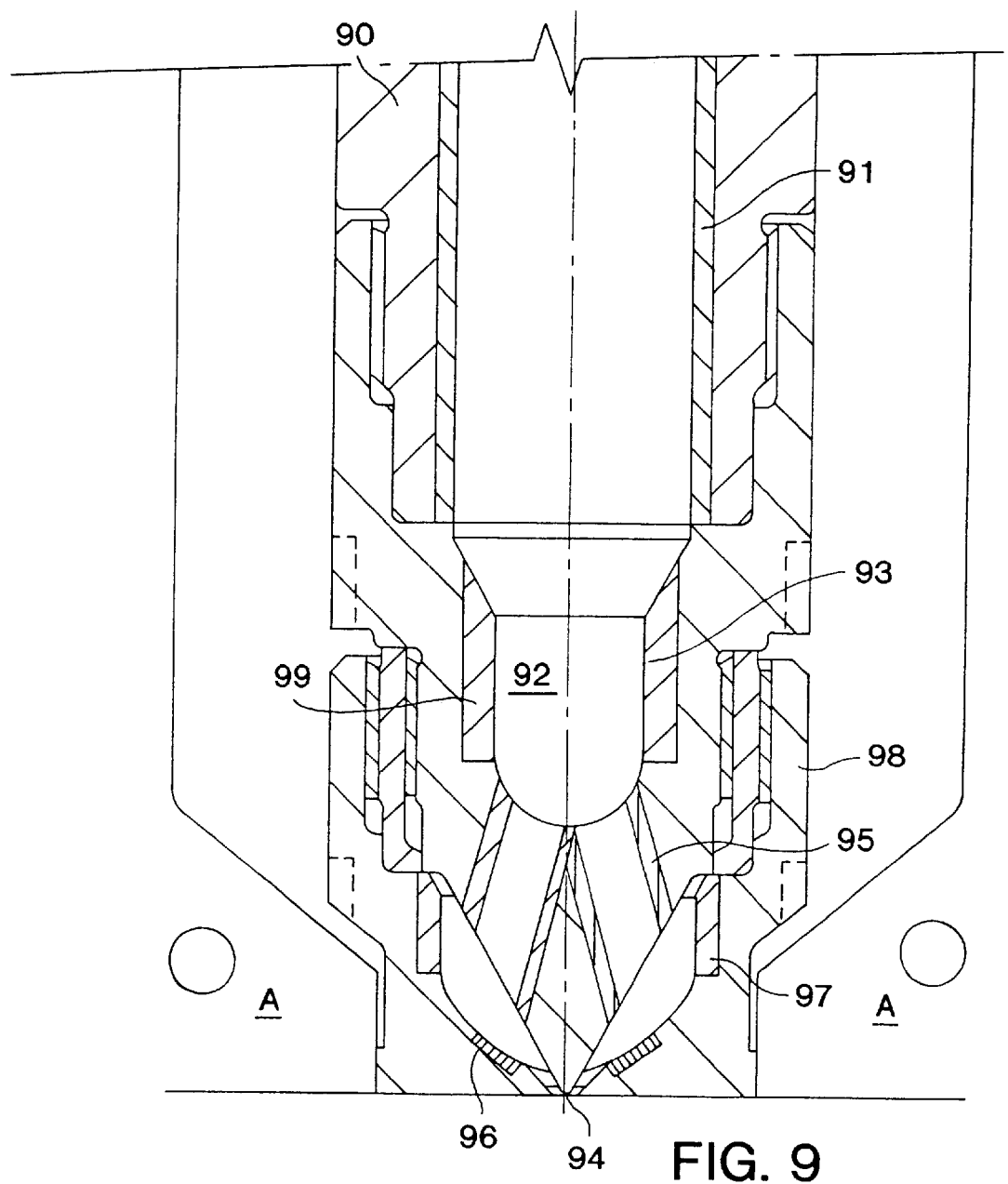
FIG. 9 is a cross sectional view of an improved nozzle tip and mold gate insert in accordance with an yet another embodiment of the present invention.

FIG. 9 shows an improved design of a hot runner nozzle tip in accordance with an embodiment of the present invention. Active and passive thin film elements are located inside the hot runner nozzle body 90 along the melt channel 92 and in close proximity to the mold gate area 94. The active thin film elements are heaters 91, 93, 95, and 97 for maintaining the resin at an optimum temperature. Apart from compactness and energy savings, the thin film heaters confer several other significant advantages. For example, the thin film heaters are easy to locate in areas that are not accessible to coil heaters, such as in the immediate vicinity of the mold gate.

In the illustrated embodiment, the thin film heaters 95 are located along diverter channels of the nozzle tip. The thin film heaters 97 may also be located on the inner periphery of the mold gate insert 98 in order to heat the mold gate more effectively. Locating thin film heaters within the mold gate insert provides additional advantages with respect to "color change" preparation. As is generally known in the art, when changing resins to mold an identical piece but of a different color, one should "flush" the first resin from the nozzle channels. By locating a thin film heater 97 on the inner periphery of the mold gate insert, the insert may be heated to facilitate flushing of the gate channel. Also, heaters may be combined with thermocouples as shown at 97 and 99.

Figure 10:
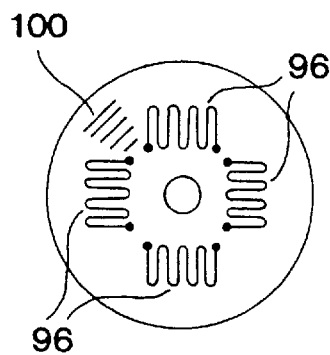
FIG. 10 is a schematic cross sectional view of the nozzle tip shown in FIG. 9.
Figure 11:
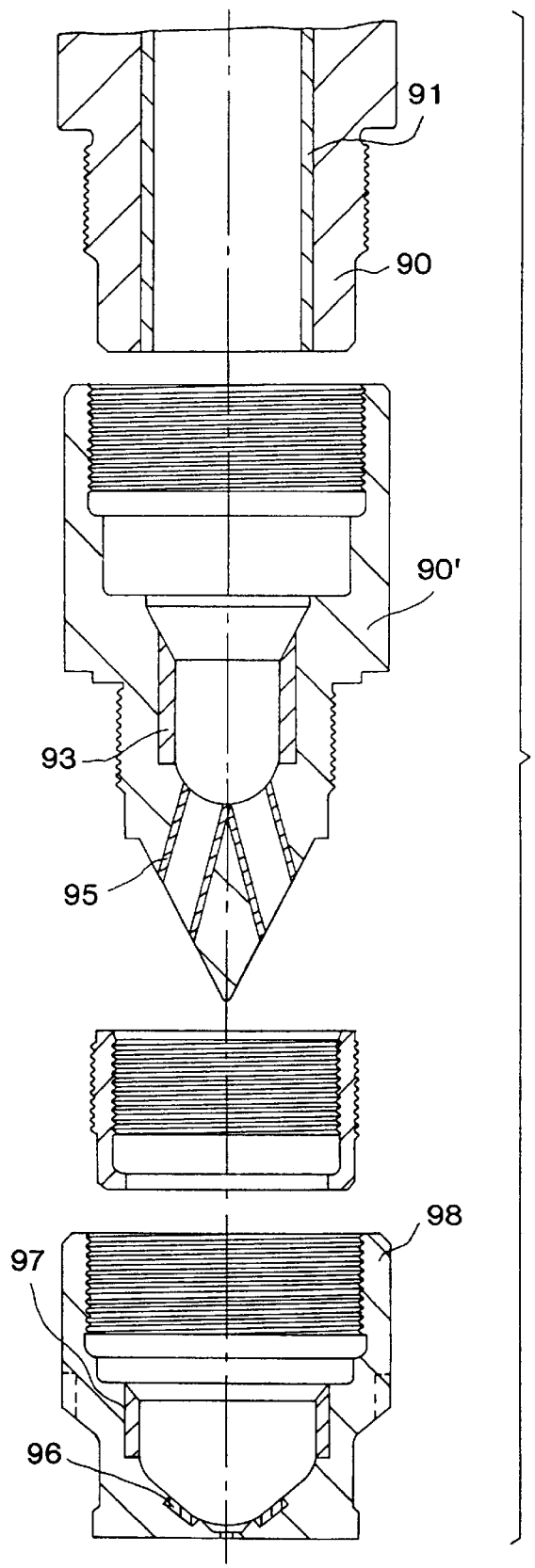
FIG. 11 is a cross section of the components of the FIG. 9 nozzle.

The mold gate insert further may comprise a thin film pressure sensor 96 and/or thin film temperature sensors (not shown). FIG. 10 shows the disposition of pressure sensors 96 and thermocouple 100 around the nozzle tip 90°. As shown in FIG. 11, the individual components of the hot runner nozzle and mold gate insert are easily removed, manufactured, and service.

Figure 12:
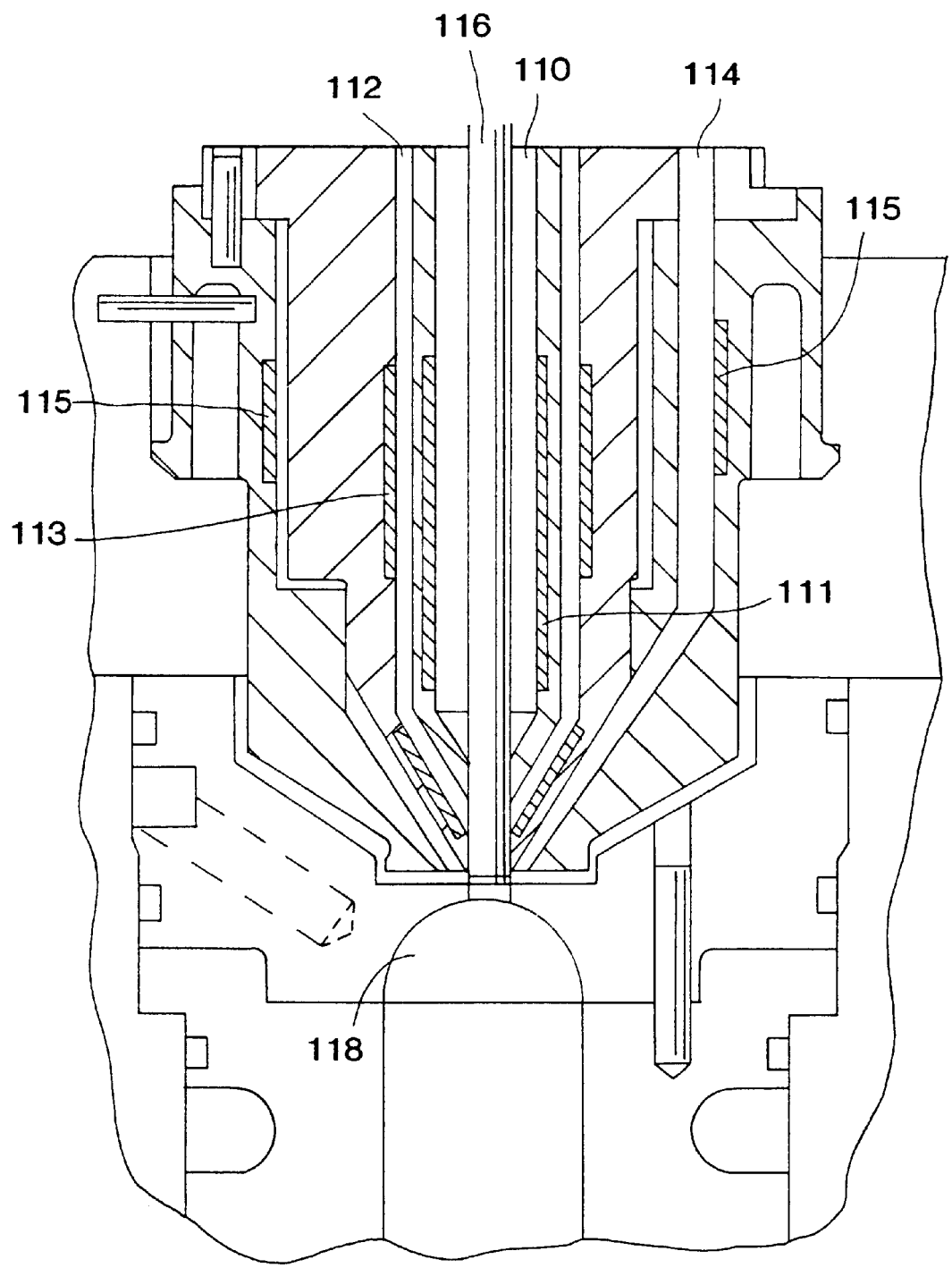
FIG. 12 is a cross sectional view of a coinjection nozzle comprising thin film heaters in accordance with another embodiment of the present invention.

FIG. 12 shows a coinjection nozzle with thin film heaters in accordance with yet another embodiment of the present invention. At least one thin film heater may be disposed around or inside the housing of each coinjection channel to better control the temperature of each resin. In this embodiment, a three channel nozzle is shown wherein the channel 110 carries resin A, channel 112 carries resin B, and channel 114 carries resin C. The valve gate stem 116 selectively shuts off communication between the nozzle channels and a cavity space 118. Thin film heaters 111, 113, and 115 are respectively located inside the channels. However, for certain applications it may be possible to use only two heaters, with one heater heating two channels if the wall between the two channels is thin and/or thermally conductive. For example, in FIG. 11 heater 111 may be sufficient to heat both resins A and B. Because the thin film heaters will directly contact the flow of molten resin, a wear resistive film may be provided directly adjacent to the flow.

Figure 13:
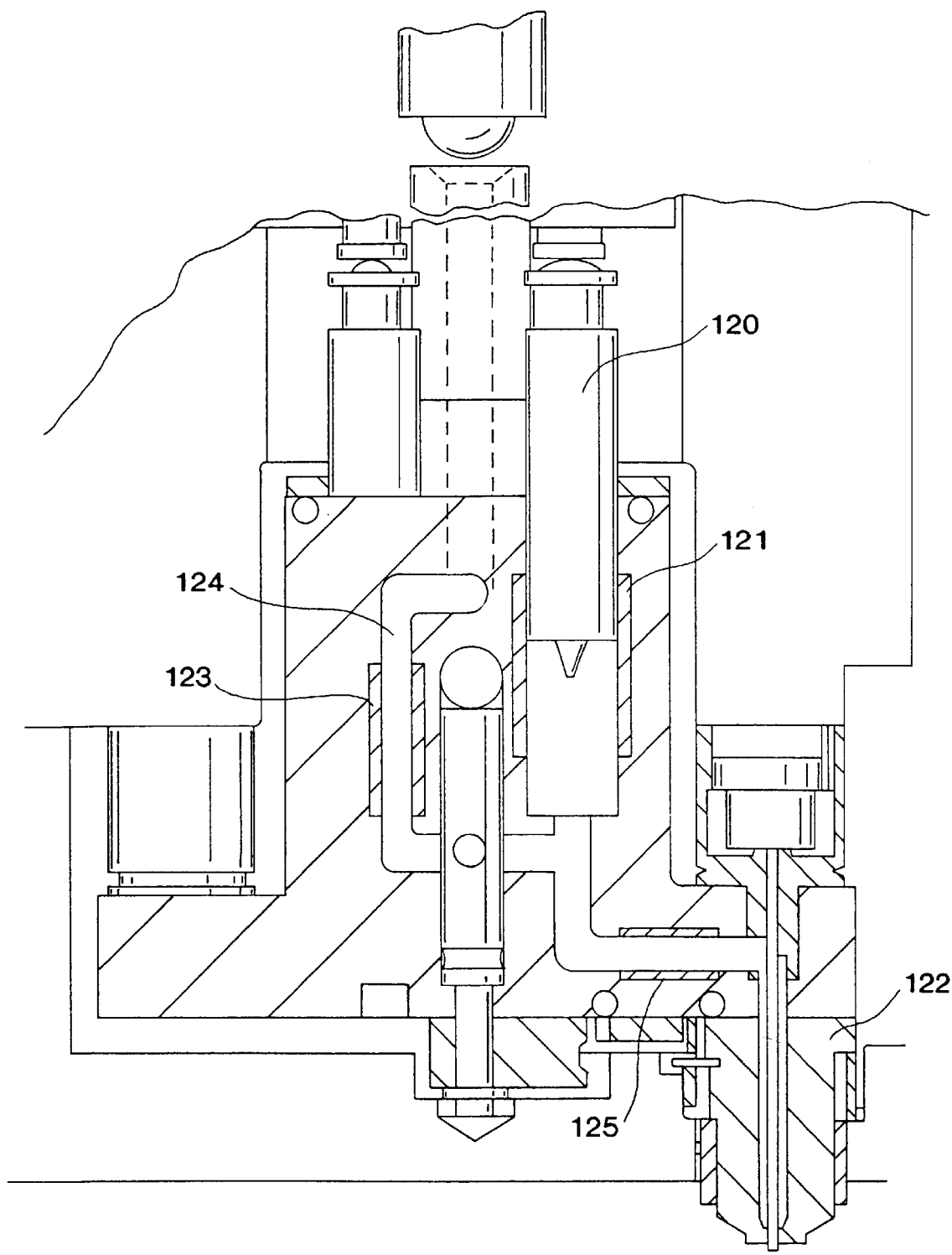
FIG. 13 is a cross sectional view of a molding machine including shooting pots and comprising thin film elements within the shooting pot.

FIG. 13 shows a molding machine including shooting pots 120 for metering the amount of resin delivered to the hot runner nozzle 122. Shooting pots are typically used when injecting parts that must meet stringent weight requirements, such as the accurately measured layers commonly required for a coinjection mold. In accordance with the present invention, thin film heaters 121 is located in the shooting pot area to heat the shooting pot area independently from other thin film manifold heaters such as heaters 123, 125 disposed on manifold 124. Additionally, thin film thermal sensors may be located in the shooting pot area.

Figure 14A:
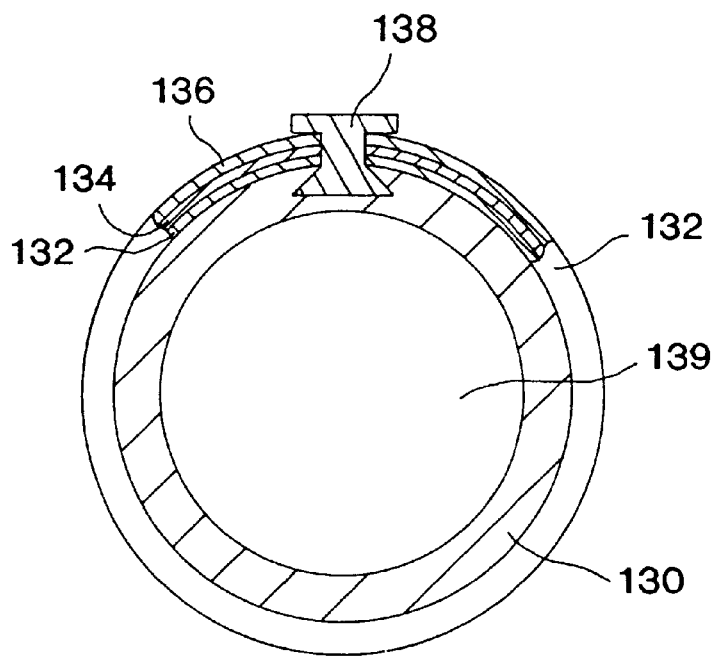
FIG. 14(a) is an axial cross sectional view of a melt channel having a thin film heater removably attached to its outer periphery.
Figure 14B:
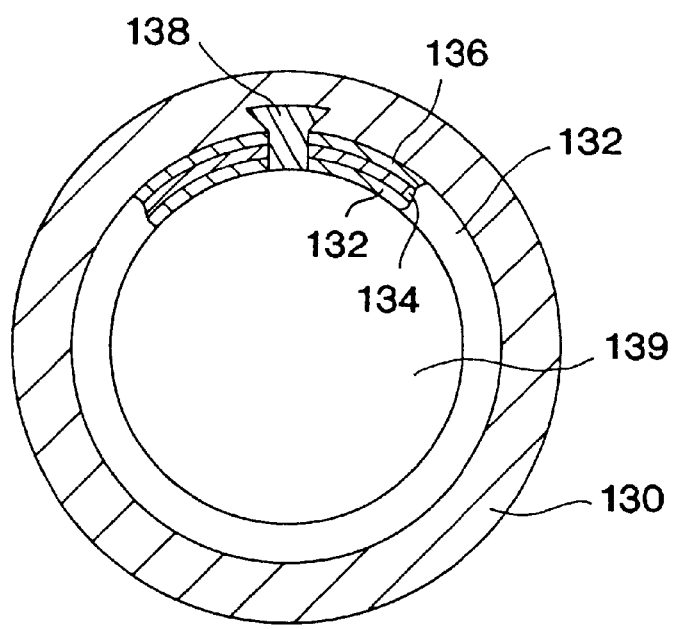
FIG. 14(b) is an axial cross sectional view of a melt channel having a thin film heater removably attached to its inner periphery.

FIGS. 14(a) and 14(b) show preferred means for removably attaching a thin film heater to either the outside or the inside of a hot runner nozzle, respectively. The thin film heater is deposited on a flexible thin, band substrate that may display spring-like characteristics. A thin film heater attached in this manner may be easily replaced in the event of a failure. In FIG. 14(a), thin film heater 132' is disposed outside of nozzle 130 and may comprise, for example, electrically insulated layer 132, electrically conductive layer 134, and electrically insulated layer 136. A connector 138 fits within a channel of the nozzle 130 and restrains the two ends of the resilient heater 132. Such construction can provide localized heat to the resin and melt channel 139. In FIG. 14(b), the heater 132' is disposed inside nozzle 130 and may also comprise the layers 132, 134, and 136. A wear layer (not shown) can also be provided between layer 132 and the melt channel 139 to present wear on the heater 132'. Of course, the heating elements in layer 134 may extend only partially around the circumference of the nozzle, and be in any configuration (spiral, planar, stripped, herringbone, annular, etc. Also, the heating elements may extend to different lengths along the axial direction of the nozzle.

Figure 15:
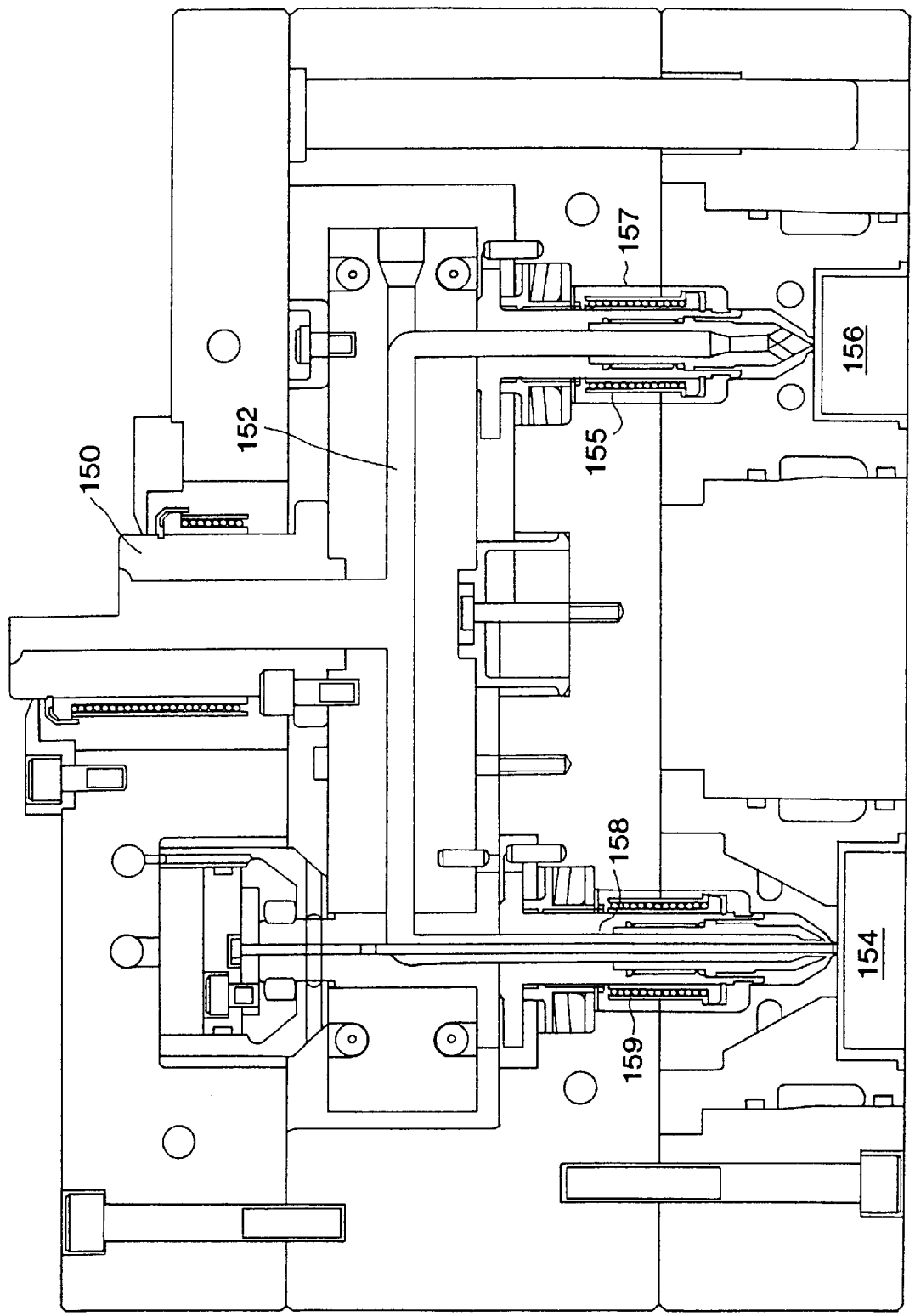
FIG. 15 is a schematic cros sectional view of a molding machine having both a valve gate and a thermal gate.

FIG. 15 shows an injection molding machine having both a hot runner valve gate and a hot runner thermal gate. The molten resin precedes from the machine injection nozzle (not shown) through the sprue bushing 150 into the manifold 152 and into the melt channel of each nozzle. The molten resin flowing through the bushing and manifold may be maintained at the optimum temperature by using well known band or coil electric heaters. The molten resin is then injected through each of the nozzles into respective mold cavities 154 and 156. The hot runner valve gate 158 has a thin film heater 159 associated therewith to maintain the molten resin at the precise, desired temperature as it passes through the valve gate 158 into the cavity 154. Likewise, the hot runner thermal gate 157 has a thin film heater 155 associated therewith to precisely control the temperature of the molten resin as it flows into cavity 156.

Figure 16A:
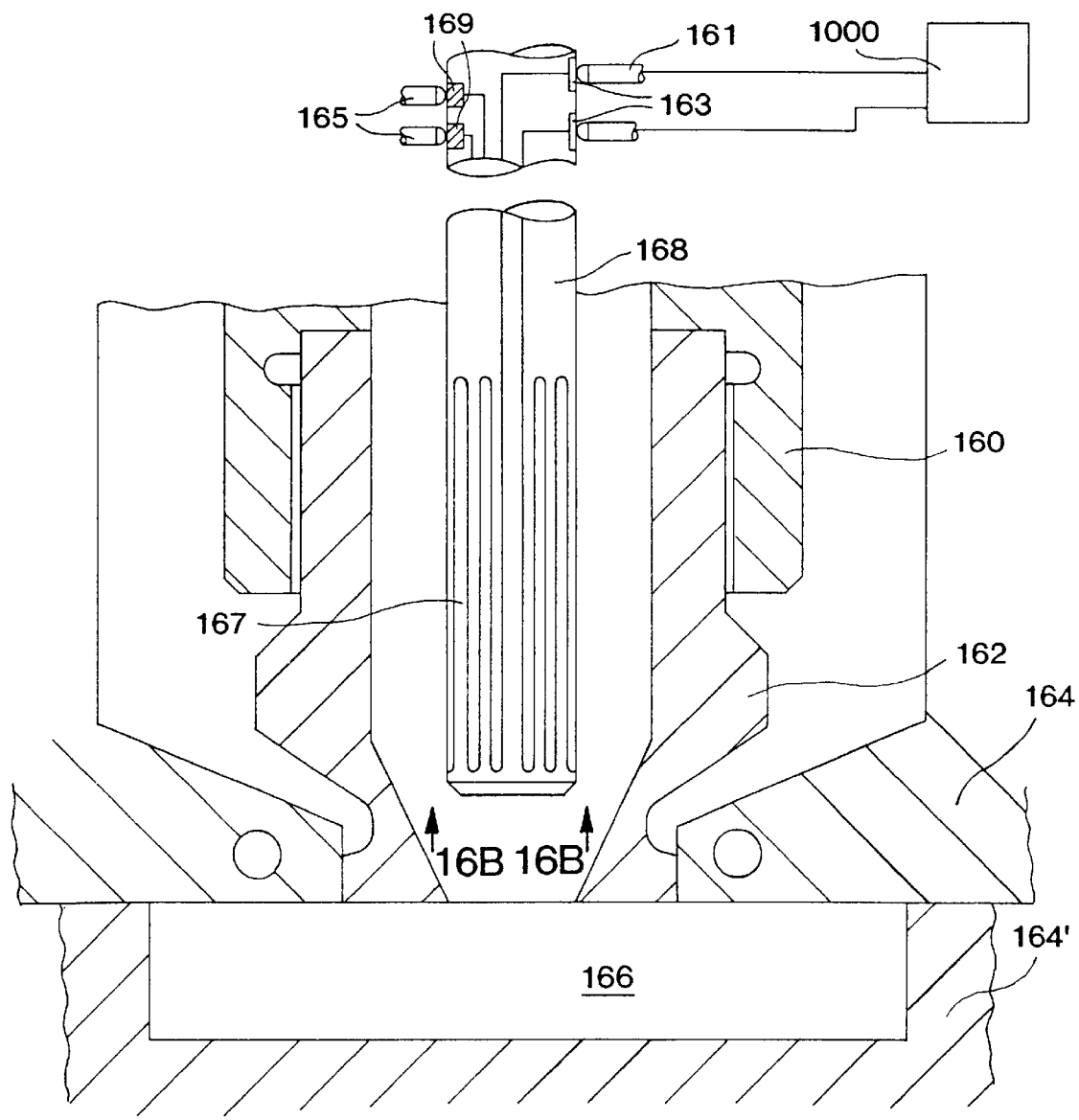
FIG. 16(a) is a schematic cross section of a valve-gated nozzle having a film heater.
Figure 16B:
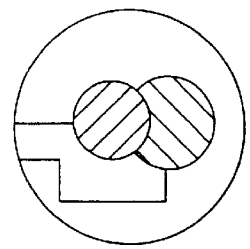
FIG. 16(b) is a schematic view of the thermocouple on the end of the valve stem of FIG. 16(a)

FIG. 16(a) is a schematic cross-section of a valve gated hot runner nozzle where a film heater is deposited directly on the tip portion of the stem, and a film thermocouple is deposited directly on the end of the stem. The valve-gated nozzle 160 has a nozzle tip 162 which fits within mold plate 164 abutting the mold plate 164' containing the mold cavity space 166. The movable valve stem 168 has a film heater 167 deposited on the outer surface thereof in a pattern, for example, as shown in FIG. 16(a). Preferably, and as shown in FIG. 16(b), a thermocouple is deposited on the end of valve stem 168 for accurate temperature measurement precisely at the valve gate itself.

As shown schematically in FIG. 16(a), the film heater 167 may be coupled to electrical contacts 161 through terminals 163. Likewise, electrical contacts 165 are disposed to contact terminals 169. The electrical contacts are coupled to a mold control processor 1000, such as that described in the Schmidt patent discussed above.

Figure 17:
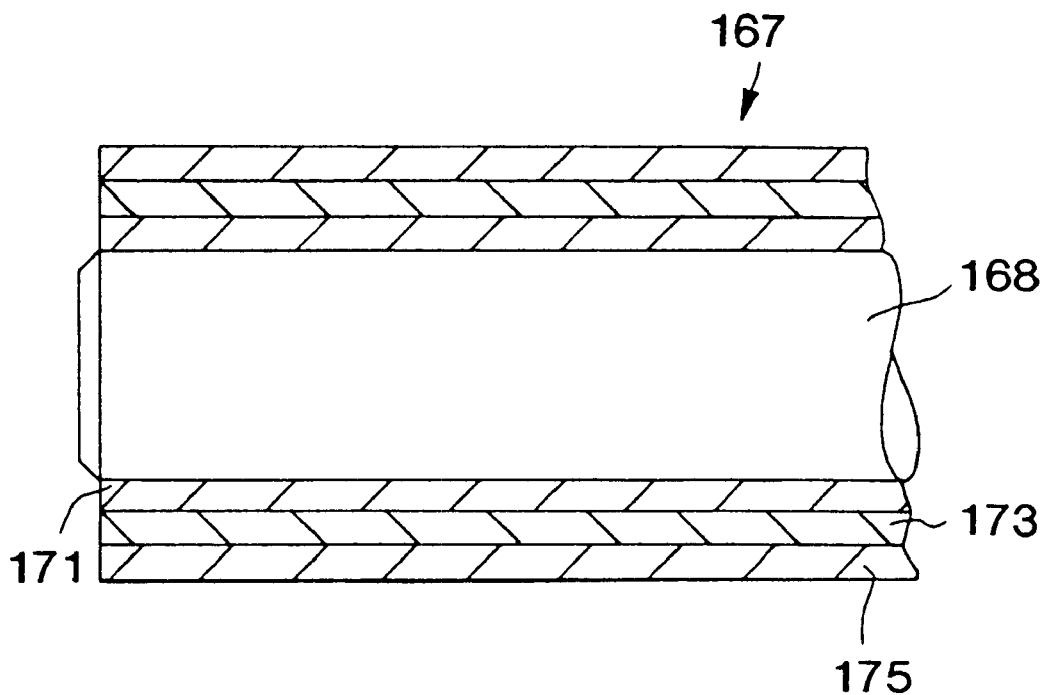
FIG. 17 is a schematic cross section of the film heater of FIG. 16(a)

FIG. 17 is a cross-sectional view of the film heater 167 of FIG. 16(a). Closest to the valve stem 168 is a layer 171 made of electrical insulative material. Next is a layer 173 which comprises the electrically resistive material forming the heating element. On the outside is layer 175 which comprises an electrically insulative material that also has good thermal transmission characteristics.

Figure 18A:
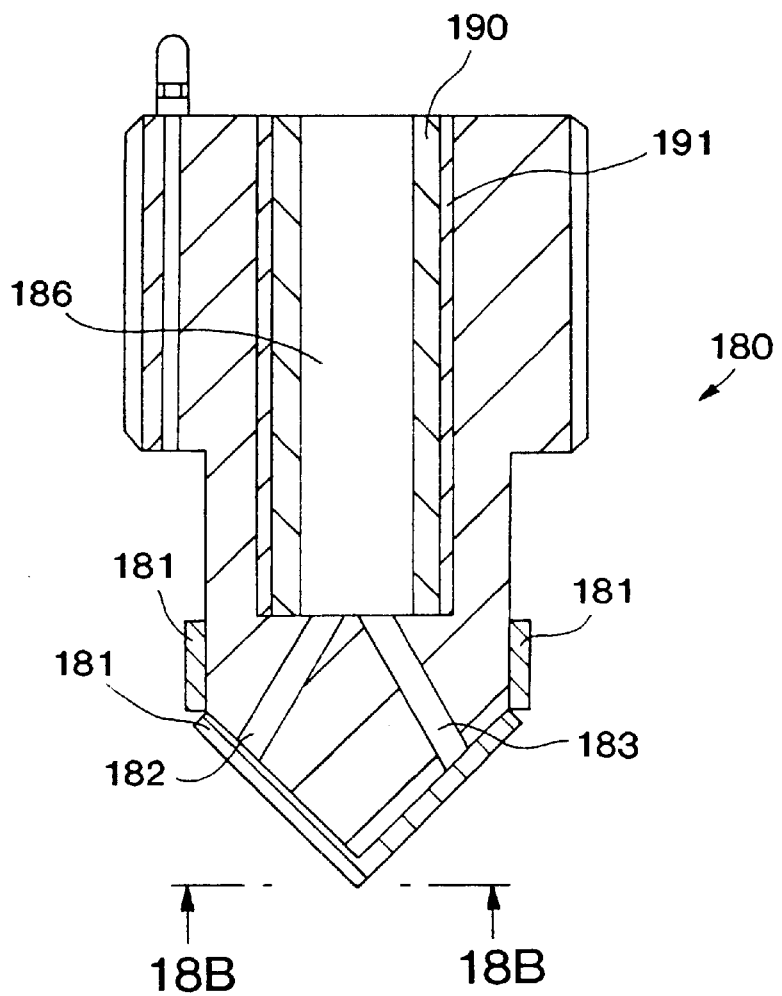
FIG. 18(a) is a schematic cross section of a nozzle tip having internal and external film heaters.
Figure 18B:
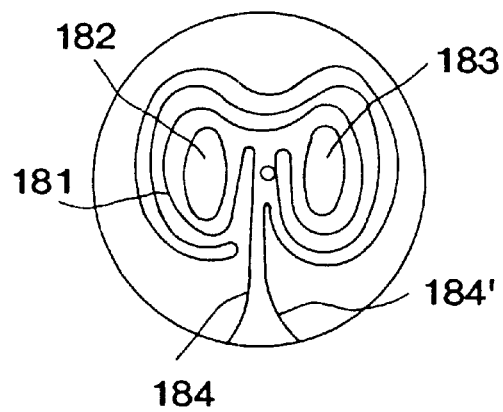
FIG. 18(b) is an end view of the film heater on the tip of the nozzle of FIG. 18(a)

FIG. 18(a) is a schematic cross-sectional drawing showing film heater 181 disposed on a bottom exterior surface of nozzle tip 180. As shown in FIG. 18(b), the film heater 181 may have a resistive pattern which surrounds the melt channels 182 and 183, as shown. The heater terminals 184 and 184' may be connected to electrical contacts (not shown).

The nozzle tip 180 may also have a heater plug 190 (to be described below) which has a film heater 191 disposed on an outer surface thereof. The heater plug 190 is disposed in the melt channel 186 of the nozzle tip 180. Both film temperature sensors (not shown), may also be deposited on any convenient surface of the nozzle tip 180 to monitor the temperature of the molten resin in the melt channel 186. Preferably, the temperature sensor is a film thermocouple disposed in direct contact with the molten resin very close to the mold gate orifice.

Preferably, the nozzle tip 180 includes electrical connectors for the thermocouple and the heater which are attached to the nozzle body by a fast removal mechanism, such as a bayonet mechanism, which allows rapid assembly and removal of the tip without having to disconnect any wiring. In some instances, it is preferable to have two thermocouples placed close to each other so that if one is broken, the other one is still operative.

Figure 19A:
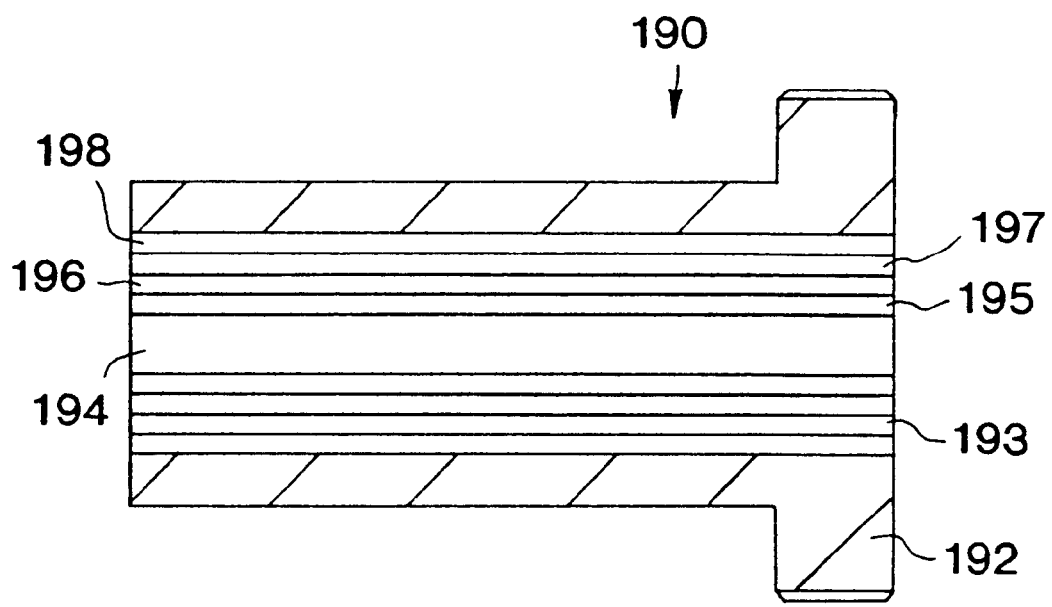
FIG. 19(a) is a schematic cross section of a nozzle plug having an internal film heater.

FIG. 19(a) is a schematic cross-section of a film heater plug 190 which is a convenient and easy way to apply film heaters and film sensors to the melt channels of injection molding machines. Plug 190 comprises a metal plug 192 having a film heater 193 disposed on an interior surface thereof adjacent the melt channel 194. Preferably, the heater 193 comprises an inner wear resistive layer 195, an electrically resistive layer 196, an electrical insulation layer 196, and a thermal insulation layer 198. The advantage of such a construction is that the plug 190 can be made small and replaceably positioned at any point in the melt channel. The plug can be used at any located in alignment with the melt channel of the mold, for example, in the manifold, in the hot runner housing or in the nozzle tip. The melt channel can be constructed complementary structure so that such heater plugs can be placed at any convenient location along the melt channel. Moreover, such plugs can be linear, T-shaped, or angled to fit any location along the melt channel. Since it is much easier to dispose a flexible film heater on the interior surface of a small replaceable heater plug, the cost of disposing that heaters on the inside surface of a long melt channel manifold (as depicted in FIG. 3) can be avoided.

Figure 19B:
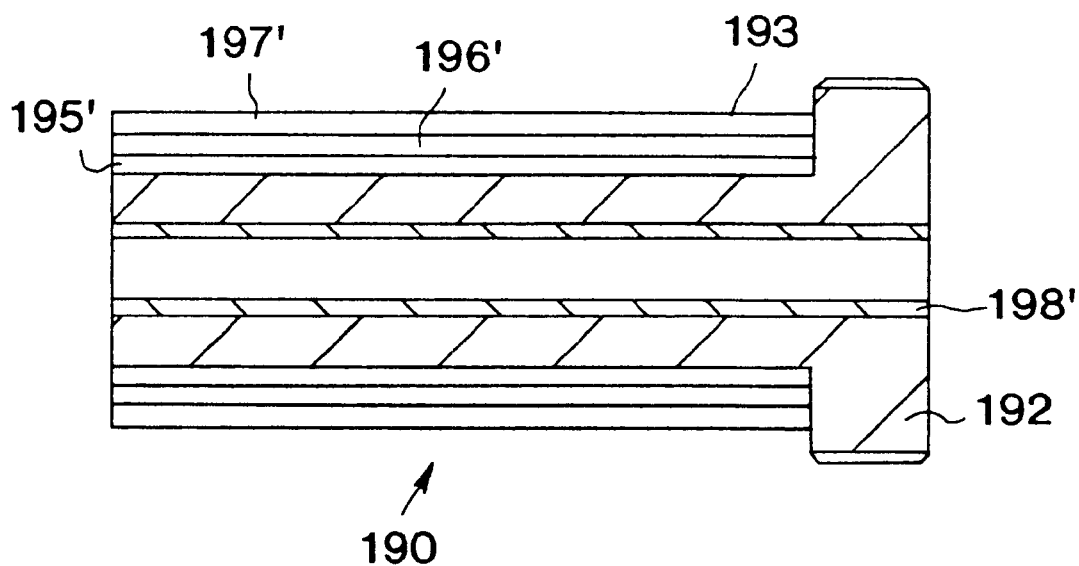
FIG. 19(b) is a schematic cross section of a nozzle plug having an external film heater.

FIG. 19(b) depicts another embodiment of the heater plug 190 in which the heater 193 is disposed on the outer surface 192. In this instance, the inner layer 195' comprises a dielectric with good thermal transmitting characteristics, layer 196' is the electrically resistive heating element, and layer 197' is a thermal insulator. In some instances, a wear resistant layer may be deposited on the outside of the layer 197'. Likewise, a wear resistant layer 198' may be deposited on the inside of the plug 192 to enhance resistant to the wear of the molten resin.

Figure 20:
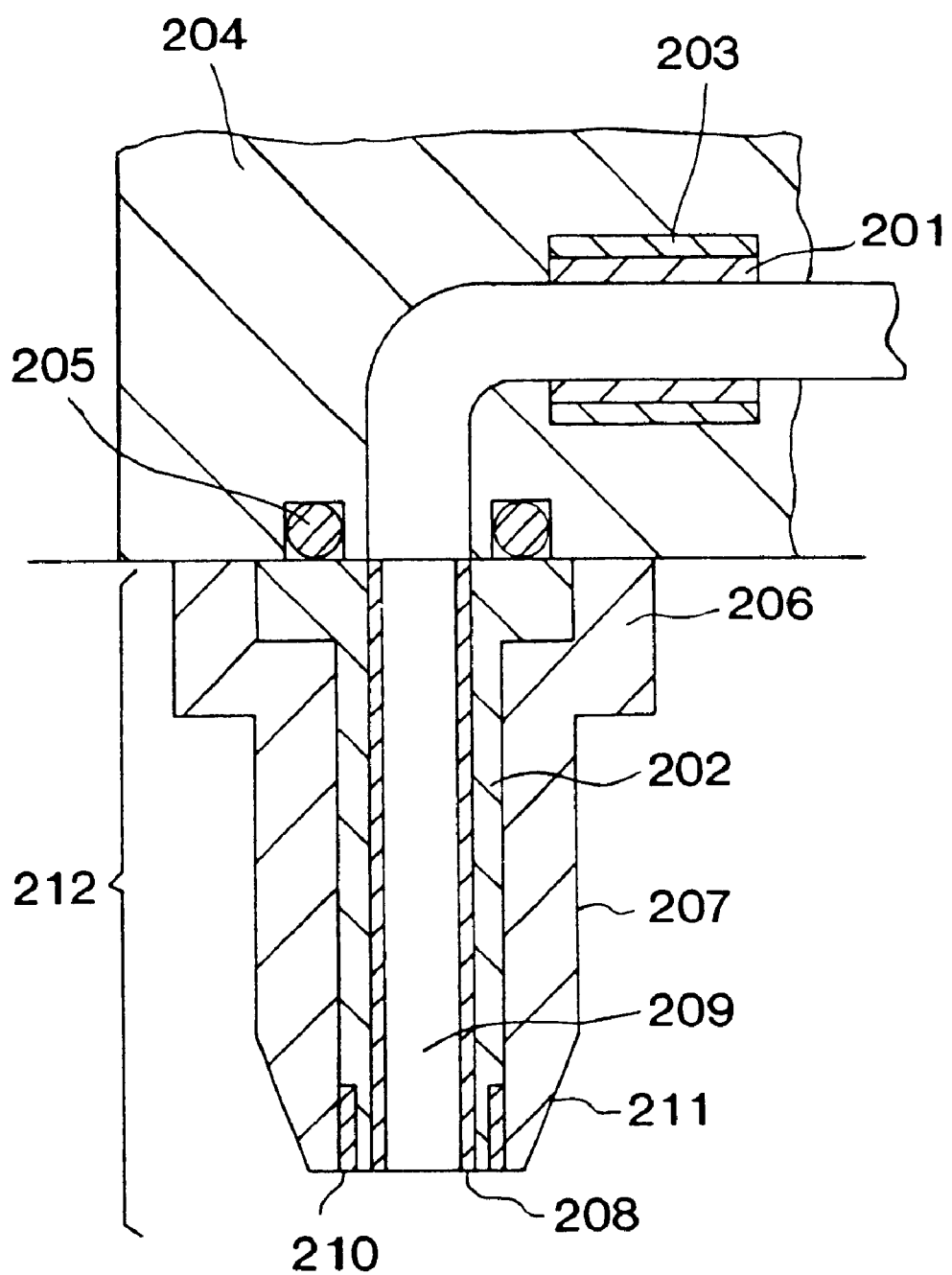
FIG. 20 is a schematic cross section of a manifold and nozzle which have film heaters.

FIG. 20 shows the application of removable heater plugs 201 and 202 within an injection molding machine. Heater plug 201 has film heater 203 on the exterior surface thereof and is disposed within manifold 204, which, for example, may also be heated by conventional manifold heater 205.

The heater plug 202 is disposed within nozzle head 206 and nozzle body 207 and has a wear resistant layer (sleeve) 208 disposed on an interior surface thereof adjacent the melt channel 209. A film heater 210 is disposed on an exterior surface of the heater plug 202 adjacent the nozzle tip 211. The nozzle housing 212 is preferably made of a thermal insulation material. The heater plugs 201 and 202 are it preferably made of a highly thermally conductive material such as CuBe. Since the heater plugs 201 and 202 are modular and removable, they may be easily replaced for repair or for the molding of different types of plastic resin.

Figure 21A:
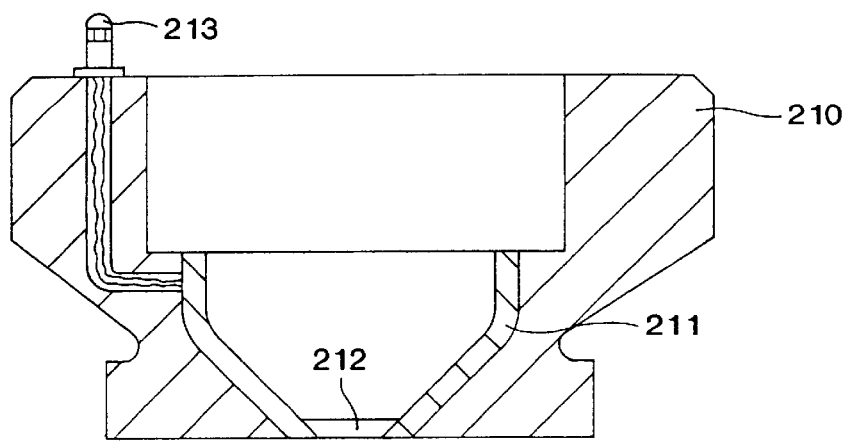
FIG. 21(a) is a schematic cross section of a mold gate insert having a film heater.
Figure 21B:
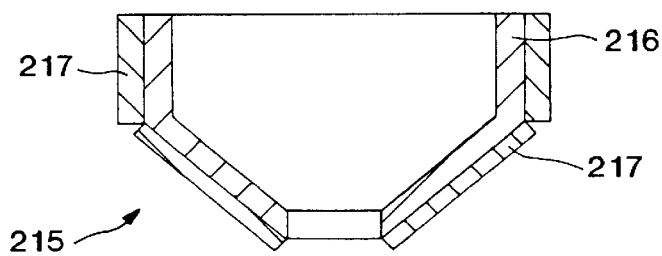
FIG. 21(b) is a schematic cross section of a mold gate sleeve having a film heater.

FIG. 21(a) is a schematic cross-section of a mold gate insert 210 having an internal film heater 211 disposed on an inside surface adjacent the nozzle tip (not shown) and the mold gate orifice 212. Since the mold gate insert 210 is removable, a connector 213 is disposed on a surface thereof to carry the electrical contact wires to the film heater 211. The connector 213 will mate with a like connector in the nozzle housing or the mold plate (not shown) so that the entire mold gate insert 210 is quickly and easily replaceable.

FIG. 22(b) is a schematic cross-section of a mold gate sleeve 215 wherein the mold gate body 216 has a film heater 217 disposed on the one or more of the outer surfaces thereof. Again, since the mold gate sleeve is easily replaceable, it is simple to replace a defective heater or to change the heating capacity of the heater for different types of resin.

Figure 22:
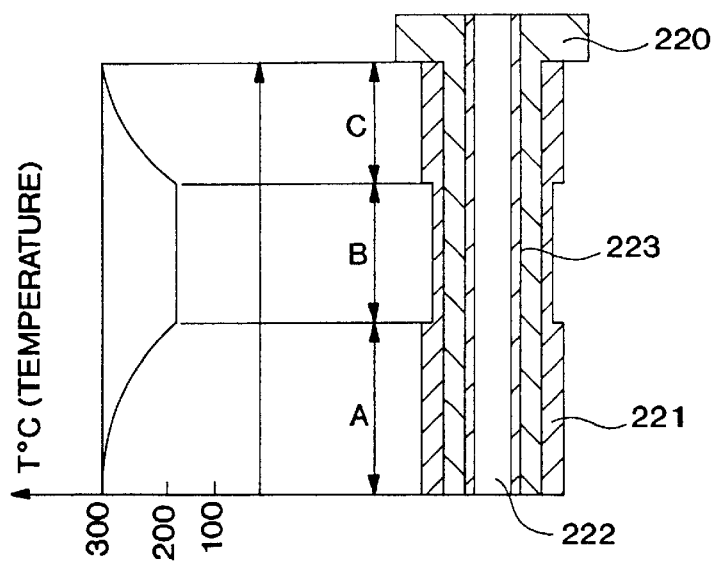
FIG. 22 is a schematic cross section of a mold plug having a film heater with different widths.

FIG. 22 is a schematic cross-section of a heater plug 220 having a film heater disposed on the outer surface thereof However, the film heater layer as different thicknesses in areas A, B, and C to provide an engineered temperature profile, as depicted in the left-hand portion of FIG. 22. This may be used, for example, in molding applications where portions A and C are located adjacent mold plates which are cooled during the molding process. This way, the molten resin flowing within he melt channel 222 will be maintained at a constant temperature. Note that in this embodiment, a high wear resistive sleeve 223 is disposed on the interior surface of the heater plug 220.

Figure 23A:
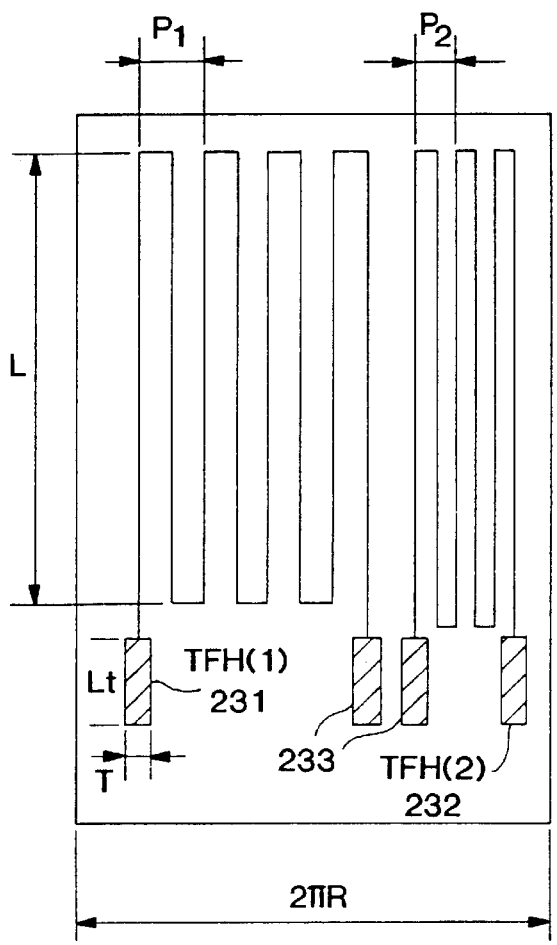
FIG. 23(a) is a schematic view of the resistive patterns on a thin film heater.
Figure 23B:
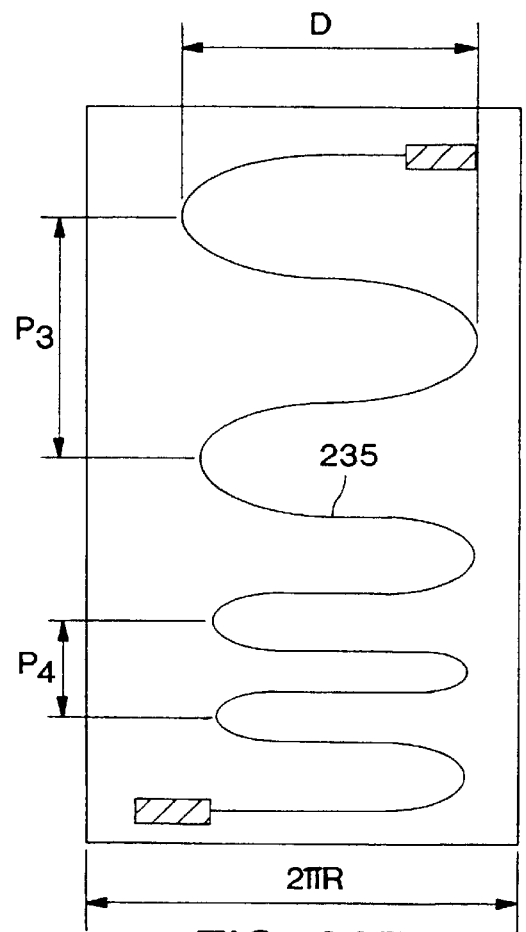
FIG. 23(b) is a schematic view of the resistive patterns on another film heater.

FIG. 23(a) is a schematic view of a thin film heater according to the present invention having two rectangular patterns of heating elements. Heater 231 has an element with a length L and a pitch P1. Heater 232 has a heating element with the same length L, but with a different pitch P2. Thus, the same thin film element may provide different heating characteristics to contiguous areas of the melt channel. The contact terminals have a length Lt and a width T adapted to easily engage electrical contacts on the melt channel structure where the heater is to be mounted FIG. 23(b) is a schematic of a heater having a serpentine shaped heating element 235 with contact terminals at different ends thereof.

Figure 23C:
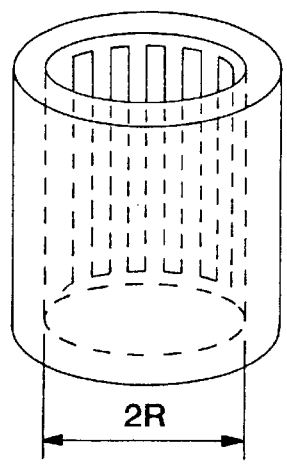
FIG. 23(c) shows a film heater disposed inside a melt channel.
Figure 23D:
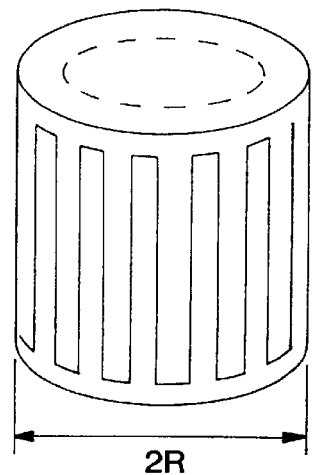
FIG. 23(d) shows a film heater disposed on the outside of a melt channel.

FIG. 23(c) shows a film heater bent so as to be disposed on the inside of a melt channel, and FIG. 23(d) shows such a heater bent on the outside of a melt channel.

The following materials, deposition technologies, and patterning methods are recommended for the various layers used to manufacture the compound film heater deposited directly on the mold elements or on a film heater plug (the thickness of these layers varies from less than 5 microns and up to 2–3 millimeters):

electrical resistive materials: TiN; tungsten, molybdenum, gold, platinum, copper, TiC, TiCN, TiAlN, CrN, palladium, iridium, silver, conductive inks electrical insulative materials: beryllium oxide; see also the materials disclosed in the U.S. Pat. No. 5,653,932 and U.S. Pat. No. 5,468,141 both herein incorporated by reference.

wear resistance materials: titanium, titanium alloys, chrome, electroless nickel, also see the materials disclosed in the U.S. Pat. No. 5,112,025 herein incorporated by reference.

deposition technologies: ion plating, sputtering, chemical vapor deposition (CVD), physical vapor deposition (PVD), flame spraying.

film patterning methods: etching through a mask; laser removal; wire masking, mechanical removal, Example for the heat requirement: Wattage Density 40–80 W/square inch at 240 V See FIG. 13

Zone A: 37 mm 150 W (tip)
Zone B: 75 mm 50 W (center)
Zone C: 34 mm 100 W (head)
One or several heaters Patterning: laser removal; lathe; mask wire, etching
Deposition: sputtering
Materials: platinum, tungsten, Molybdenum
Film Sensors for Molding Applications.

Film temperature sensing elements have been disclosed in, for example, U.S. Pat. No. 5,215,597 issued to Kreider, U.S. Pat. No. 5,573,335 issued to Schinazi, NASA Report E-7574 of February 1993 by R. Holanda and NASA Report E-9080 of August 1994 by L. C. Martin et al., all of which are all incorporated herein by reference.

Any film temperature sensing device, such as thermistors, other semiconductor based devices or resistance temperature detectors (RTD) are encompassec by the scope of the current invention. Reference is made in this regard to U.S. Pat. No. 4,968,964 issued to Nagai et al., and the Platinum Resistance Temperature Detector (P-RTD)) Catalogs of Heraeus that are incorporated herein by reference. The current invention also encompasses a thin film RTD as another preferable alternative to a film thermocouple, because it offers the advantage of being made of a single thin film material that is easier to deposit and etched.

According to the current invention, it is preferable to select the materials for the film thermocouple that meet the current thermocouple standards (such as ANSI), and that can be deposited on the support base of the mold part. Accordingly, a major design target for the film thermocouple is to select two dissimilar materials for the wires that are either identical or close to the resistive material of the thin film heater. The following commercial data published by Insulation Seal Inc. and SRS Corp. show the material selection and characteristics for several standard thermocouples that can be also used as guidelines to manufacture film thermocouples.

| ANSI Type | Thermocouple Pair Materials & Polarity | TC Temperature (max.) | Medium Std. Error |
|---|---|---|---|
| T | Copper (+) Constantan (−) | 350° C. | |
| J | Iron (+) Constantan (−) | 750° C. | +/− 2.2° C. |
| E | Chromel (+) Constantan (−) | 900° C. | +/− 1.7° C. |
| K | Chromel (+) Alumel (−) | 1250° C. | +/− 2.2° C. |
| R | Platinum 13% Rhodium (+) Platinum (−) | 1450° C. | +/− 1.4° C. |
| S | Platinum 10% Rhodium (+) Platinum (−) | 1450° C. | +/− 1.4° C. |
| C | Tungsten 5% Rhenium (+) Tungsten 26% Rhenium (−) | 2320° C. | |
| B | Platinum 30% Rhodium (+) Platinum 6% Rhodium (−) | 1700° C. | +/− 4.4° C. |

According to the current invention, the film thermocouple is made using well known microlithographic techniques that insure a very high dimensional accuracy, excellent adhesion of the themocouple to the substrate and connection between the two dissimilar materials. Another advantage of the microlithographic technique is that a batch of thermocouples can be simultaneously manufactured in order to ensure that the thickness of the deposited alloy is the same for several temperature sensing elements that will be mounted in a high cavitation mold. Another adavantage is that, with no extra cost and within the same space, a "back up" or a reference thermocouple can be actually deposited close to the actual thermocouple. In this manner, if for whatever reason the current thermocouple fails to respond, the back up can be activated, without interrupting the molding process or servicing the mold.

In a preferred embodiment, a thin film l-class) thermocouple is made of Platinum-13% Rhodium and Platinum and is manufactured in a class 1000 Clean Room using the well known sputtering process. Depending on the location of the thin film wires to the lead wires connections are made using the well known parallel-gap welding process. This thermocouple can be located anywhere along the melt channel as it can withstand temperatures in excess of 1,000° C.

Thus, what has been described is unique structure and function whereby heating, sensing, and melt control in a molding machine may be simplified, made easy to replace, and may be customized and to provide molded articles more quickly, less expensively, and with higher quality.

While the present invention has been described with respect to what are presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

We claim:

1. An injection molding hot runner nozzle heater disposed on an outer surface of the nozzle, comprising:

a dielectric layer directly deposited on the outer cylindrical surface of the nozzle;

a thin film conductive-ink resistive heater layer directly deposited on said dielectric layer;

a wear resistant layer directly deposited over said heater; and two electrical contacts disposed on said dielectric layer and in contact with said heater.

2. A heater according to claim 1, wherein said heater comprises two heating elements respectively coupled to said to electrical contacts and coupled to each other, said heating elements being disposed in a pattern about a circumference of the dielectric layer.

3. A heater according to claim 2, wherein said pattern comprises one of a spiral, a planar, a striped, a herringbone, or an annular pattern.

4. A heater according to claim 1, further comprising a thin film temperature sensor directly deposited on the outer cylindrical surface of the nozzle.

5. A heater according to claim 1, wherein said dielectric layer and said protective layer comprise thin film layers.

6. A heater according to claim 1, wherein said protective layer comprises a thermal insulation layer.

7. An injection molding nozzle comprising:

a metal nozzle body;

a film dielectric layer deposited over an outer cylindrical surface of said nozzle body;

a thin film conductive-ink resistive heater deposited in a repeating pattern on a portion of said dielectric layer;

first and second electrical contacts deposited on said dielectric layer and in electrical contact with respective first and the second ends of said heater; and a thermal insulation layer deposited over said heater.

8. A nozzle according to claim 7, wherein said heater comprises a linear resistive heating element disposed in a spiral pattern.

9. A nozzle according to claim 8, wherein said heating element comprises a plurality of layers.

10. A nozzle according to claim 7, further comprising first and second electrical terminals coupleable to said first and second electrical contacts, respectively.

11. A nozzle according to claim 7, further comprising a heat conducting band substrate disposed on said the nozzle body outer surface, and wherein said dielectric layer is directly deposited on an outer cylindrical surface of said conductive band.

12. A nozzle according to claim 11, wherein said conducting band is displays spring characteristics.

13. A heater for an injection molding runner nozzle, comprising:

a cylindrical, heat-conducting band substrate adapted to be placed over an outer surface of the nozzle, said band being spring-like to tightly contact the outer surface of the nozzle;

a first dielectric layer directly deposited on an outer cylindrical surface of said band;

a linear, conductive-ink resistive heating element directly deposited on said first dielectric layer, said heating element being formed in a pattern to apply heat through said band to the nozzle, said heating element having first and second ends, each said end having an electrical terminal; and a second dielectric layer directly deposited over said heating element, but not over the terminals.

14. A heater according to claim 13, wherein said heating element is disposed in a spiral pattern.

15. A heater according to claim 13, further comprising first and second electrical contacts respectively coupled too said electrical terminals.

16. A heater according to claim 15, wherein said second dielectric layer comprises an electrically insulating and mechanically protective layer.

* * * * *